(12) United States Patent
Kennelly

(10) Patent No.: US 12,515,261 B2
(45) Date of Patent: Jan. 6, 2026

(54) JIG FOR FORMING A FLOATING CONNECTION BETWEEN MUTUALLY TRANSVERSE STRUCTURAL MEMBERS

(71) Applicant: Illinois Tool Works Inc., Glenview, IL (US)

(72) Inventor: Bernard Joseph Kennelly, New South Wales (AU)

(73) Assignee: Illinois Tool Works Inc., Glenview, IL (US)

( * ) Notice: Subject to any disclaimer, the term of this patent is extended or adjusted under 35 U.S.C. 154(b) by 510 days.

(21) Appl. No.: 17/921,813

(22) PCT Filed: May 5, 2021

(86) PCT No.: PCT/US2021/030907
§ 371 (c)(1),
(2) Date: Oct. 27, 2022

(87) PCT Pub. No.: WO2021/226248
PCT Pub. Date: Nov. 11, 2021

(65) Prior Publication Data
US 2023/0173590 A1   Jun. 8, 2023

(30) Foreign Application Priority Data

May 6, 2020 (AU) .................. 2020901436
Oct. 29, 2020 (AU) .................. 2020903929
May 4, 2021 (AU) .................. 2021202828

(51) Int. Cl.
*B23B 47/28* (2006.01)
*E04G 21/18* (2006.01)

(52) U.S. Cl.
CPC .......... *B23B 47/28* (2013.01); *E04G 21/1891* (2013.01)

(58) Field of Classification Search
CPC ..... B23B 47/28; B23B 47/281; B23B 47/282; B23B 47/284; B23B 47/285;
(Continued)

(56) References Cited

U.S. PATENT DOCUMENTS 1,114,373 A * 10/1914 Lane ................. B23B 47/28
408/110
2,413,362 A   12/1946 Maxwell et al.
(Continued)

FOREIGN PATENT DOCUMENTS

CH         695482 A5    6/2006
DE       1653045 A1 *  9/1971
(Continued)

OTHER PUBLICATIONS

Structural Connectors Catalog from ITW BCG Hardware, published 2012/2013 (124 pages).
(Continued)

*Primary Examiner* — Nicole N Ramos
(74) *Attorney, Agent, or Firm* — Neal, Gerber & Eisenberg LLP

(57) ABSTRACT

A jig configured to be positioned relative to first and second members, which extend along mutually transverse first and second axes respectively and are spaced along a third axis which is transverse to the first and second axes, for locating a hole-forming element with respect to the members and guiding the thus located element along said third axis during driving of the hole-forming element into the first member whereby a hold thus formed in the first member extends along said third axis for application therethrough, axially guided by the jig so positioned and/or the hole, of a connecting element to interconnect the members, such that first and second portions of the connecting element thus applied are received at correct positions in the first and (Continued)

second members respectively, the jig comprising: locators arranged to be received against the first and second members and rotationally about the first and second axes; and a guide defining an axis that is fixed relative to the locators ("guide axis"), the guide being configured to support the hole-forming element such that it extends along the guide axis and being arranged such that the guide axis is coaxial with the third axis when the locators are so received, whereby said driving of the hole-forming element forms the hole along the third axis.

6 Claims, 26 Drawing Sheets

(58) Field of Classification Search
CPC .............. B23B 47/287; B23B 2247/04; B23B 2247/06; B23B 2247/08; B23B 2247/12; B23B 2247/14; B23B 2247/16; B23B 2247/18; B23B 2247/20
See application file for complete search history.

(56) References Cited

U.S. PATENT DOCUMENTS

| | | | |
|---|---|---|---|
| 2,638,643 A * | 5/1953 | Olson | E04B 1/2608 |
| | | | 428/575 |
| 2,764,818 A * | 10/1956 | Gard | B25H 7/00 |
| | | | 33/520 |
| 3,031,669 A * | 5/1962 | Lawson | B23B 47/28 |
| | | | 33/613 |
| 3,064,504 A * | 11/1962 | Jarboe | B23B 51/0054 |
| | | | 408/72 R |
| 3,328,890 A * | 7/1967 | Fagerberg, Sr. | B25H 7/04 |
| | | | 33/666 |
| 3,633,950 A | 1/1972 | Gilb | |
| 3,874,086 A * | 4/1975 | Ludlam | B23B 47/28 |
| | | | 33/666 |
| 4,007,573 A | 2/1977 | Gilb | |
| 4,022,537 A | 5/1977 | Gilb et al. | |
| 4,204,785 A * | 5/1980 | Rowlings | B23B 47/287 |
| | | | 33/667 |
| 4,228,594 A * | 10/1980 | Shlager | G01B 5/14 |
| | | | 33/562 |
| 4,291,996 A | 9/1981 | Gilb | |
| 4,455,805 A | 6/1984 | Rionda et al. | |
| 4,572,695 A | 2/1986 | Gilb | |
| 4,714,372 A | 12/1987 | Commins | |
| 4,717,279 A | 1/1988 | Commins | |
| 4,841,690 A | 6/1989 | Commins | |
| 4,896,985 A | 1/1990 | Commins | |
| 4,932,173 A | 6/1990 | Commins | |
| 5,027,573 A * | 7/1991 | Commins | E04B 5/12 |
| | | | 52/480 |
| 5,101,932 A | 4/1992 | Trudgeon | |
| 5,109,646 A | 5/1992 | Colonias et al. | |
| 5,123,172 A * | 6/1992 | Thrun | E04F 21/00 |
| | | | 33/526 |
| 5,150,982 A | 9/1992 | Gilb | |
| 5,178,503 A | 1/1993 | Losada | |
| 5,179,787 A * | 1/1993 | Ostrowski | A47H 1/10 |
| | | | 33/528 |
| 5,259,685 A | 11/1993 | Gilb | |
| 5,324,132 A | 6/1994 | Hunter et al. | |
| 5,335,469 A | 8/1994 | Stuart | |
| 5,341,619 A | 8/1994 | Dunagan et al. | |
| 5,380,115 A | 1/1995 | Colonias | |
| 5,410,854 A | 5/1995 | Kimmell et al. | |
| 5,419,649 A | 5/1995 | Gilb | |
| 5,555,694 A | 9/1996 | Commins | |
| 5,603,580 A | 2/1997 | Leek et al. | |
| 5,732,524 A | 3/1998 | Kalker et al. | |
| 6,022,165 A | 2/2000 | Lin | |
| 6,213,373 B1 | 4/2001 | Wakai | |
| 6,230,466 B1 | 5/2001 | Pryor | |
| 6,230,467 B1 | 5/2001 | Leek | |
| 6,473,982 B1 * | 11/2002 | Schimes | E04F 21/003 |
| | | | 33/562 |
| 6,510,666 B1 | 1/2003 | Thompson | |
| 6,513,290 B2 | 2/2003 | Leek | |
| 6,560,943 B1 | 5/2003 | Leek et al. | |
| D476,217 S | 6/2003 | Shea | |
| 6,698,971 B1 | 3/2004 | Wilhelmi | |
| 7,065,932 B2 | 6/2006 | Roesset et al. | |
| 7,334,372 B2 | 2/2008 | Evans et al. | |
| D618,085 S | 6/2010 | Lin et al. | |
| 7,805,894 B2 * | 10/2010 | Contasti | E04B 5/12 |
| | | | 52/99 |
| 7,886,494 B1 | 2/2011 | Schott | |
| D638,280 S | 5/2011 | Mcalonan | |
| 8,176,689 B1 | 5/2012 | Thompson | |
| 8,793,889 B2 * | 8/2014 | Hovren | E04G 21/1891 |
| | | | 33/526 |
| 8,827,132 B2 | 9/2014 | Mina et al. | |
| 8,910,452 B2 | 12/2014 | Noturno | |
| D768,470 S | 10/2016 | Noturno | |
| D787,917 S | 5/2017 | Kennelly | |
| D796,938 S | 9/2017 | Rago | |
| D823,096 S | 7/2018 | Kennelly | |
| D855,441 S | 8/2019 | Schmonsees et al. | |
| D867,112 S | 11/2019 | Taylor | |
| D912,497 S | 3/2021 | Herbertsson | |
| 11,033,988 B2 | 6/2021 | Jaffe | |
| D960,677 S | 8/2022 | Kennelly | |
| 2002/0124500 A1 | 9/2002 | Thompson | |
| 2004/0240950 A1 | 12/2004 | Trettin et al. | |
| 2010/0011697 A1 | 1/2010 | Nguyen et al. | |
| 2010/0166497 A1 | 7/2010 | Vilasineekul | |
| 2012/0061535 A1 | 3/2012 | Taneichi | |
| 2015/0298217 A1 | 10/2015 | Clark et al. | |
| 2018/0142463 A1 | 5/2018 | Siddhartha et al. | |
| 2019/0285224 A1 | 9/2019 | Mckechnie et al. | |

FOREIGN PATENT DOCUMENTS

| | | | | |
|---|---|---|---|---|
| EP | 3581726 A1 | 12/2019 | | |
| GB | 1399098 A * | 6/1975 | ........... | B23B 47/287 |
| WO | WO-0168301 A1 * | 9/2001 | ........... | B23B 47/287 |
| WO | 2018048905 A1 | 3/2018 | | |

OTHER PUBLICATIONS

European Examination Report from European Application No. 21734558.6, dated Dec. 22, 2023 (4 pages).

International Search Report and Written Opinion from International Application No. PCT/US2021/030907, mailed Sep. 1, 2021 (17 pages).

European Examination Report from European Application No. 21734558.6, dated Dec. 23, 2024 (6 pages).

* cited by examiner

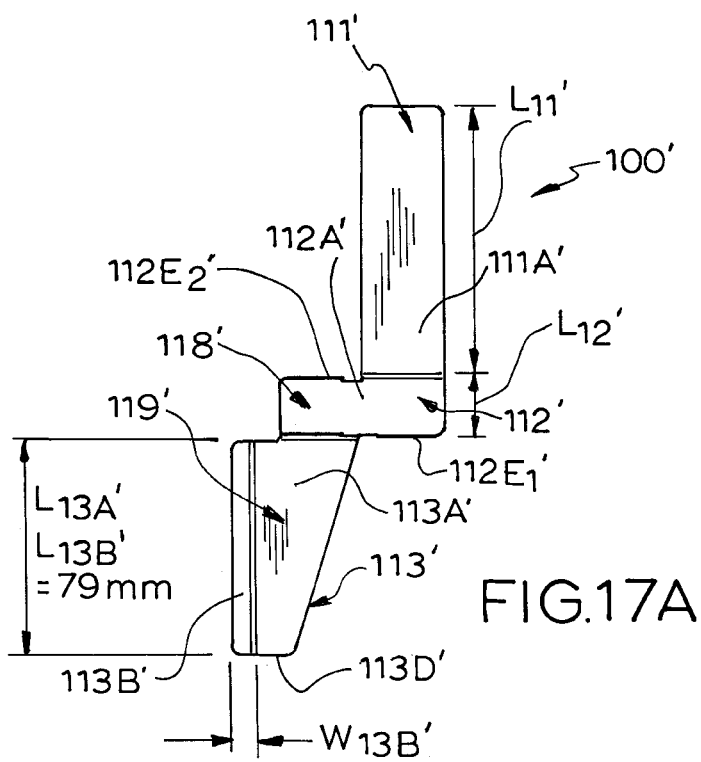
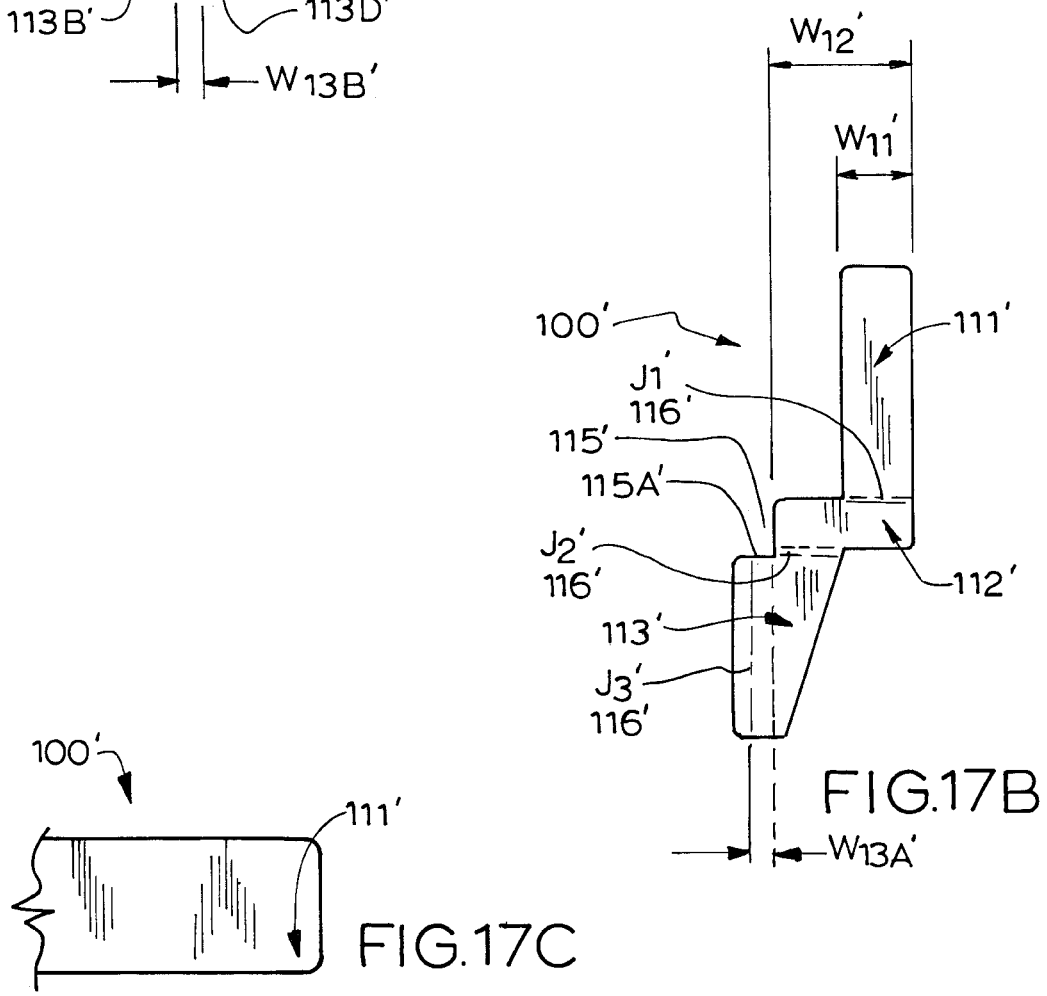
FIG.17A
FIG.17B
FIG.17C

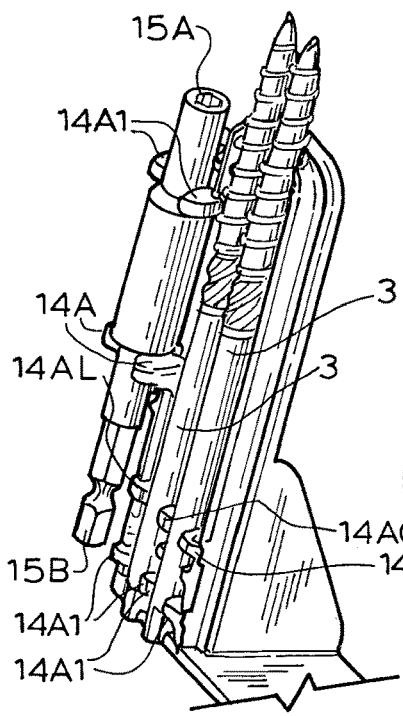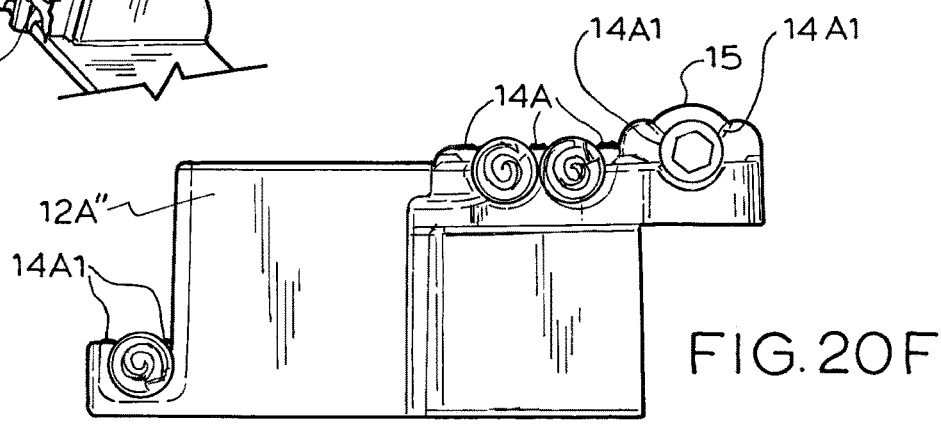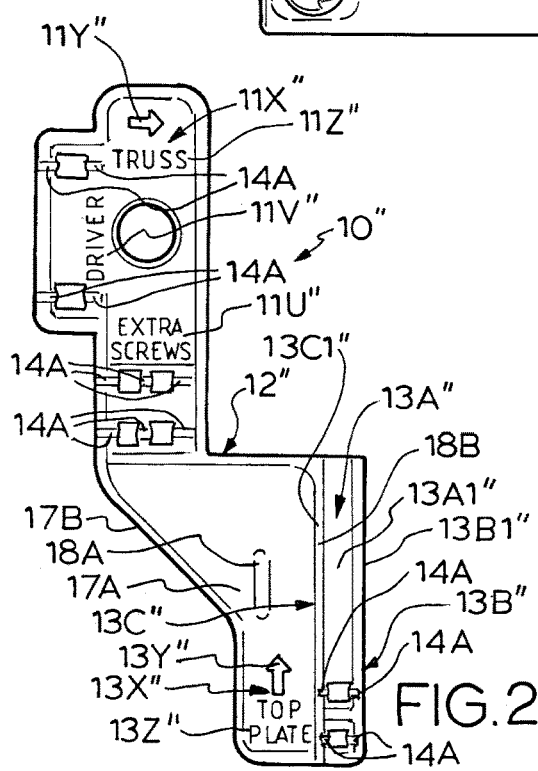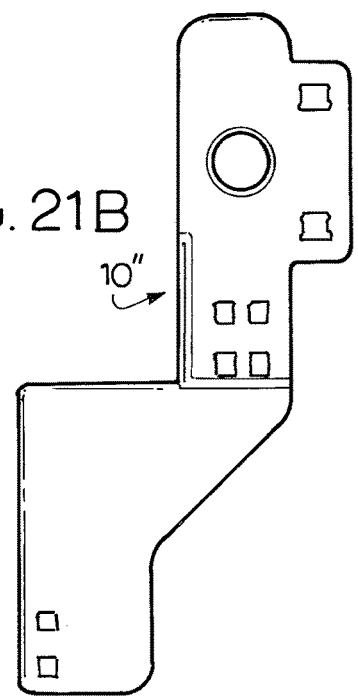

JIG FOR FORMING A FLOATING CONNECTION BETWEEN MUTUALLY TRANSVERSE STRUCTURAL MEMBERS

PRIORITY

This application is a national stage application of PCT/US2021/030907, filed on May 5, 2021, which claims priority to and the benefit of Australian Provisional Patent Application No. 2020901436, filed May 6, 2020, Australian Provisional Patent Application No. 2020903929, filed Oct. 29, 2020, and Australian Patent Application No. 2021202828, filed May 4, 2021, the entire contents of each of which are incorporated herein by reference.

BACKGROUND

Various known apparatus and methods are used to connect structural members. There is an ongoing need for new and improved apparatus and methods for connecting structural members.

SUMMARY

The present disclosure relates to a jig for installation, in a correct position/orientation, a connecting element to interconnect structural members which extend along mutually transverse axes and are separated along an axis transverse to those axes, or for forming in the first member, or in each of the first and second members, a hole in a correct position/orientation to receive such a connecting element. The present disclosure also relates to the use of the jig to perform such an installation, to a connection (between the first and second members) thus formed, and to a method of/blank for forming such a jig.

The present disclosure has particular though not exclusive applicability for forming a connection between a structural member, such as a roof frame member, and a wall member, such as a wall frame top plate, such that vertical movement of/in the structural member is permitted but horizontal movement of/in the structural member and/or wall member is precluded.

The present disclosure has particular though not exclusive application to the transfer of racking loads from ceiling diaphragms to non-loadbearing bracing walls in buildings, in a manner which permits vertical movement, such as that resulting from roof truss camber dissipation, of a structural member forming part of a ceiling plane/diaphragm. The present disclosure also has particular, though not exclusive, application to the lateral stabilisation of the top edge of an internal non-load bearing wall that acts as a partition and does not contribute to the transfer of bracing forces from the ceiling plane to the foundation in a building.

The present disclosure has particular though not exclusive application to construction of a timber-framed building, in which at least one said structural member is timber and/or forms part of a timber frame in the building.

According to a first aspect of the present disclosure, there is provided a jig configured to be positioned relative to first and second members, which extend along mutually transverse first and second axes respectively and are spaced along a third axis which is transverse to the first and second axes, for locating a hole-forming element with respect to the members and guiding the thus located element along said third axis during driving of the hole-forming element into the first member whereby a hole thus formed in the first member extends along said third axis for application therethrough, axially guided by the jig so positioned and/or the hole, of a connecting element to interconnect the members, such that first and second portions of the connecting element thus applied are received at correct positions in the first and second members respectively, the jig comprising:

locators arranged to be received against the first and second members such that the jig is correctly located translationally along each of the first and second members and rotationally about the first and second axes; and a guide defining an axis that is fixed relative to the locators ("guide axis"), the guide being configured to support the hole-forming element such that it extends along the guide axis and being arranged such that the guide axis is coaxial with the third axis when the locators are so received, whereby said driving of the hole-forming element forms the hole along the third axis.

Preferably, the locators comprise first and second locators receivable against a surface of the first member to which each of the first and third axes is parallel ("first surface") and against a surface of the second member to which each of the second and third axes is parallel ("second surface") respectively, whereby the jig is located translationally along each of the first and second members.

Preferably, the first locator is configured such that when received against the first surface:

it engages the first member lengthways whereby rotation of the jig about an axis which lies on the first surface and is parallel to the third axis is precluded; and/or it engages the first member widthways or depthways whereby rotation of the jig about an axis which lies on the first surface and is perpendicular to the third axis is precluded.

In an embodiment of the present disclosure, the first locator comprises a locating face whereby when received against the first surface it so engages the first member lengthways and so engages the first member widthways or depthways.

In an embodiment of the present disclosure, the first locator comprises a locating edge whereby when received against the first surface it either so engages the first member lengthways or so engages the first member widthways or depthways.

In an embodiment of the present disclosure, the first locator comprises a locating edge whereby when received against the first surface it so engages the first member widthways or depthways.

Preferably, the second locator is configured such that when received against the second surface:

it engages the second member lengthways whereby rotation of the jig about an axis which lies on the second surface and is parallel to the third axis is precluded; and/or it engages the second member widthways or depthways whereby rotation of the jig about an axis which lies on the second surface and is perpendicular to the third axis is precluded.

In an embodiment of the present disclosure, the second locator comprises a locating face whereby when received against the second surface it so engages the second member lengthways and so engages the second member widthways or depthways.

In an embodiment of the present disclosure, the second locator comprises a locating edge whereby when received against the second surface it either so engages the second member lengthways or so engages the second member widthways or depthways.

In an embodiment of the present disclosure, the second locator comprises a locating edge whereby when received against the second surface it so engages the second member widthways or depthways.

Preferably, the jig comprises a wall a face of which defines said locating face ("locating wall"). Preferably, an edge of the locating wall defines said locating edge.

In an embodiment of the present disclosure, said locating edge extends parallel to said locating face.

Preferably, the locators comprise a locator receivable against a surface of the first or second member to which the third axis is transverse ("transverse surface") such that the guide is correctly positioned along the third axis ("guide locator").

Preferably, the guide locator is configured such that when received against the transverse surface:

it engages the member comprising said transverse surface ("the transverse member") lengthways whereby rotation of the jig about an axis which lies on the transverse surface and is perpendicular to the said axis along which the transverse member extends is precluded; and/or it engages the transverse member widthways or depthways whereby rotation of the jig about an axis which lies on the transverse surface and is parallel to the said axis along which the transverse member extends is precluded.

In an embodiment of the present disclosure, the guide locator comprises a face ("guide-locating face") whereby when received against the transverse surface it so engages the transverse member lengthways and so engages the transverse member widthways or depthways.

In an embodiment of the present disclosure, the guide locator comprises an edge ("guide-locating edge") whereby when received against the transverse surface it either so engages the transverse member lengthways or so engages the transverse member widthways or depthways.

In an embodiment of the present disclosure, the guide locator comprises an edge ("guide-locating edge") whereby when received against the transverse surface it so engages the transverse member widthways or depthways.

In an embodiment of the present disclosure, the guide locator comprises an edge ("guide-locating edge") whereby when received against the transverse surface it so engages the transverse member lengthways.

Preferably, the jig comprises a wall defining the guide locator ("guide locator wall").

Preferably, a face of the guide locator wall defines the guide-locating face.

In an embodiment of the present disclosure, an edge of the guide locator wall defines the guide-locating edge.

In an embodiment of the present disclosure, the guide is supported from the guide locator.

Preferably, the guide comprises at least one wall arranged to extend parallel to the guide axis ("guide wall"), for sideways receipt thereagainst of the hole-forming element such that it precludes displacement of the hole-forming element transverse to said guide axis ("transverse displacement") during the driving thereof.

Preferably, said at least one guide wall comprises surface portions which extend parallel to the guide axis and face in non-parallel directions, for sideways receipt thereagainst of the hole-forming element to preclude said transverse displacement.

In a preferred embodiment of the present disclosure, said at least one guide wall comprises guide walls angled one-to-another faces of which define said surface portions.

Preferably, the guide walls angled one-to-another comprise first and second guide walls.

Preferably, the first and second guide walls are mutually orthogonal and/or arranged such that the faces thereof defining said surface portions are mutually orthogonal.

Preferably, either or each of the first guide wall and said face thereof is parallel to said locating face, whereby either or each of the second guide wall and said face thereof is perpendicular to said locating face.

In a preferred embodiment of the present disclosure, the jig is bent and/or folded from plate or a blank configured in the form of a plate.

In a preferred embodiment of the present disclosure, each of said walls comprises or is defined by a respective plate portion.

According to a second aspect of the present disclosure, there is provided a method of forming a said jig, comprising:

providing plate or a blank configured in the form of a plate; and bending and/or folding the plate or blank, such that said walls are defined by respective portions of said plate or blank.

Preferably, the plate or blank comprises a portion configured to define a said locating wall ("locating wall portion"), and a section configured to define the other wall(s), and the method comprises forming a bend or fold at a junction between said locating wall-defining portion, such that the locating wall is defined.

Preferably, said section comprises a plate portion configured to define said guide locator wall ("guide locator wall portion").

Preferably, said junction comprises or is defined by a junction between the locating wall portion and the guide locator wall portion.

Preferably, said section comprises a section bendable or foldable to define said at least one guide wall ("bendable or foldable section"), and the method includes bending or folding the bendable or foldable section to form the guide wall(s).

Preferably, the bendable or foldable section comprises first and second portions and the bending or folding of that section comprises forming a bend or fold at a junction between the first and second portions, such that said first and second guide walls are defined by the first and second portions respectively.

Preferably, the method includes forming a bend or fold at a junction between the guide locator wall portion and the bendable or foldable section, such that the guide locator wall is defined.

Preferably, the junction between the guide locator portion and the bendable or foldable section comprises or is defined by a junction between the guide locator portion and said first or second portion.

Preferably, the junction between the guide locator portion and the bendable or foldable section comprises or is defined by a junction between the guide locator portion and said second portion.

According to a third aspect of the present disclosure, there is provided a said jig formed by said method.

According to a fourth aspect of the present disclosure, there is provided a/the plate or a blank bendable and/or foldable to form said jig, such that said walls are defined by respective portions of the plate or blank.

Preferably, the plate or a blank comprises a portion configured to define the locating wall ("locating wall portion") and a section configured to define the other wall(s), and is bendable or foldable at a junction between said locating wall portion and said section, such that the locating wall is defined.

Preferably, said section comprises a plate portion configured to define the guide locator wall ("guide locator wall portion").

Preferably, said junction comprises or is defined by a junction between the locating wall portion and the guide locator wall portion.

Preferably, said section comprises a section bendable or foldable to define the guide wall(s).

Preferably, the bendable or foldable section comprises first and second portions and is bendable or foldable at a junction between the first and second portions, such that said first and second guide walls are defined by the first and second portions respectively.

Preferably, the plate or blank is bendable or foldable at a junction between the guide locator wall portion and the bendable or foldable section, such that the guide locator wall is defined.

Preferably, the junction between the guide locator wall portion and the bendable or foldable section comprises or is defined by a junction between the guide locator wall portion and said first or second portion.

Preferably, the junction between the guide locator wall portion and the bendable or foldable section comprises or is defined by a junction between the guide locator wall portion and said second portion.

According to a fifth aspect of the present disclosure, there is provided a jig bent and/or folded from a said plate or blank, said walls of the jig being defined by said respective portions of the plate or blank.

According to a sixth aspect of the present disclosure, there is provided a method of forming, in the former or each of first and second members extending along mutually transverse first and second axes respectively and spaced along a third axis which is transverse to the first and second axes, a hole which extends along the third axis to receive a connecting element to interconnect the members, the method comprising:

positioning a said jig such that the locators thereof are received against said members, whereby the jig is correctly located translationally along each of the first and second members and rotationally about the first and second axes; and with the hole-forming element supported by the guide, driving the hole-forming element into or through the first member, whereby a hole is formed along the third axis in the first member.

In an embodiment of the present disclosure, the method comprises driving the hole-forming element, axially guided by the guide of the jig so positioned and/or the hole, such that it extends through a hole formed thereby along the third axis and through the first member ("the first hole") and is driven into or through the second member, to form along the third axis and in the second member a hole ("the second hole").

In an embodiment of the present disclosure, said hole-forming element is a hole-forming tool and is removed from the hole(s) after the formation thereof.

In an embodiment of the present disclosure, said hole-forming tool is a rotatable drilling or boring tool, the method including rotating the tool during the driving thereof so as to form said hole(s).

In an embodiment of the present disclosure, said tool is coupled to or forms part of a powered machining apparatus, the method including operating the apparatus to rotate and drive said tool to form said hole(s).

According to a seventh aspect of the present disclosure, there is provided a method of interconnecting first and second members extending along mutually transverse first and second axes respectively and spaced along a third axis which is transverse to the first and second axes, the method comprising:

forming a hole in the former (first) or each of the first and second members by a method according to the fifth or sixth aspect;

with the hole-forming element removed from the hole(s), applying said connecting element, axially guided by the guide of the jig so positioned and/or by said hole or either or each of the first and second holes, through said hole or the first hole, to the members to interconnect them, such that first and second portions of the connecting element thus applied are received at correct positions in the first and second members respectively.

In an embodiment of the present disclosure, applying said connecting element comprises directing it, along said hole, through the first member, and thence directing it into or through the second member.

In an embodiment of the present disclosure, directing the connecting element through the first member comprises driving it within or through the first member along the third axis.

In an embodiment of the present disclosure, directing the connecting element through the first member comprises slotting or sliding it within or through said hole.

In an embodiment of the present disclosure, directing the connecting element into or through the second member comprises driving it within or through the second member along the third axis.

In an embodiment of the present disclosure, the driving of the connecting element within or through the second member along the third axis is axially guided by said hole.

In an embodiment of the present disclosure, directing the connecting element into or through the second member comprises directing it along the second hole.

In an embodiment of the present disclosure, directing the connecting element into or through the second member comprises driving it within or through the second member along the third axis.

In an embodiment of the present disclosure, directing the connecting element into or through the second member comprises slotting or sliding it within or through said second hole.

According to an eighth aspect of the present disclosure, there is provided a method of interconnecting first and second members extending along mutually transverse first and second axes respectively and spaced along a third axis which is transverse to the first and second axes, the method comprising forming a hole in each of the first and second members by a method according to the sixth aspect, wherein forming said hole comprises driving the hole-forming element, axially guided by the guide of the jig so positioned and/or the hole, such that it extends through a hole formed thereby along the third axis and through the first member ("the first hole") and is driven into or through the second member, to form along the third axis and in the second member a hole ("the second hole"), said method including applying the connecting element to the members such that it interconnects them, wherein the hole-forming element defines or is said connecting element, whereby the applying of the connecting element comprises the driving of the hole-forming element through the first member and into or through the second member to effect receipt of first and second portions of the connecting element at correct positions in the first and second members respectively.

In an embodiment of the present disclosure, the driving of the hole-forming element through the first member and into or through the second member effects application of the connecting element such that it interconnects the members.

According to a ninth aspect of the present disclosure, there is provided a method of interconnecting first and second members extending along mutually transverse first and second axes respectively and spaced along a third axis which is transverse to the first and second axes, the method comprising:

positioning a said jig such that the locators thereof are received against said members, whereby the jig is correctly located translationally along each of the first and second members and rotationally about the first and second axes;

with the hole-forming element supported by the guide, driving the hole-forming element along said third axis into or through the first member; and further driving the hole-forming element, such that it is driven along said third axis into or through the second member, wherein the hole-forming element defines or is said connecting element, whereby the driving of the hole-forming element through the first member and into or through the second member effects receipt of first and second portions of the connecting element at correct positions in the first and second members respectively.

In an embodiment of the present disclosure, the method includes removing the jig after driving of the hole-forming element into or through the first member and prior to said further driving.

In an embodiment of the present disclosure, the further driving of the hole-forming element comprises driving the hole-forming element, supported by the guide of the jig so positioned.

In an embodiment of the present disclosure, the method is such that the driving of the hole-forming element through the first member and into or through the second member effects application of the connecting element such that it interconnects the members.

In an embodiment of the present disclosure, the connecting element or the element defining it comprises a fastener. Preferably, the fastener is a threaded fastener.

In an embodiment of the present disclosure, the connecting element or the element defining it comprises a shank arranged to extend along said third axis and either or each of the first and second portions is defined on or by the shank.

In an embodiment of the present disclosure, the applying of the connecting element comprises, with a driver:

driving the connecting element, or the hole-forming element defining it, in and/or through the first member; and/or driving the connecting element, or the hole-forming element defining it, in and/or through the second member.

In an embodiment of the present disclosure, the driver is powered.

In an embodiment of the present disclosure, the driving of the connecting element or the element defining it comprises rotating the element about an axis thereof which is parallel or coaxial with said third axis.

In an embodiment of the present disclosure, the driver is a screw driver or screw-driving device.

In an embodiment of the present disclosure, either or each member can move relative to the other in a direction comprising a component along said third axis, the connecting element being configured such that (the) first and second portions thereof form, with the first and second members respectively, fits permitting relative movement between the members along or parallel to said third axis and precluding relative translational movement between the members orthogonal to the third axis, whereby there is defined a floating connection between the members interconnected via the connecting element, whereby loading perpendicular to the third axis in either member is transferred to the other member.

In an embodiment of the present disclosure, the applying of the connecting element is such that the first and second portions thereof form said fits, whereby there is defined said floating connection.

In an embodiment of the present disclosure, said third axis is substantially upright.

In an embodiment of the present disclosure, the connecting element is rigid.

In an embodiment of the present disclosure, the connecting element is secured to one of the members so as to be anchored to that member ("the anchoring member") such that it projects from that member, along the third axis, into the other member to be received by that other member ("the receiving member").

In an embodiment of the present disclosure, there is formed, between the element and said receiving member, a sliding fit which permits relative movement between the element and said receiving member parallel to the third axis but precludes relative translational movement between said element and said receiving member perpendicular to the third axis, thereby allowing either or one of the members to move parallel to the third axis but transferring, from that member to the other or vice versa, loads perpendicular to the third axis so as to brace the member from which it transfers the loads.

In an embodiment of the present disclosure, the members comprise a wall member and a structural member respectively.

In an embodiment of the present disclosure, the wall member is a top plate of a wall frame.

In an embodiment of the present disclosure, said element is introduced through a surface of said first member which faces away from said second member, so as to extend through said first member, and thence driven into said second member.

In an embodiment of the present disclosure, the element is elongate along said axis.

In an embodiment of the present disclosure, the element is threaded.

In an embodiment of the present disclosure, the element is self-tapping and driven through said first member so as to form therethrough a passage in which it extends in said connection.

In an embodiment of the present disclosure, the element has a threaded portion and a threadless portion between the threaded portion and a trailing end of the element, and is driven through said first member such that in the connection, the threaded portion is disengaged from said first member and the threadless portion extends in the passage so as to be able to slide axially therein, thus defining said first portion.

In an embodiment of the present disclosure, the element comprises a reaming portion, between the threaded portion and the threadless portion, which reams said first member during driving of the element and is passed through said first member so as to be spaced therefrom in said connection.

In an embodiment of the present disclosure, the reaming portion is not smaller in cross-section than the threadless portion.

In an embodiment of the present disclosure, the reaming portion is larger in cross section than the threadless portion.

In an embodiment of the present disclosure, the reaming portion is not smaller in cross-section than the trailing end, and the element is driven through said one member such that the trailing end is contained in said passage.

In an embodiment of the present disclosure, the reaming portion is larger in cross section than the trailing end.

In an embodiment of the present disclosure, the trailing end is not larger in cross-section than the threadless portion, and the element is driven through said first member such that the trailing end is contained in said passage.

In an embodiment of the present disclosure, the trailing end and threadless portion are equally sized in cross section.

In an embodiment of the present disclosure, the trailing end is configured with at least one formation arranged to be engaged by the driver, or a tool which is part of or coupled to the driver, to effect said driving.

In an embodiment of the present disclosure, the or each formation is defined by a recess formed through a trailing face of the trailing end.

In an embodiment of the present disclosure, said second member is said structural member.

In an embodiment of the present disclosure, the structural member is arranged above the wall member.

In an embodiment of the present disclosure, said surface is an underside surface of said wall member.

In an embodiment of the present disclosure, said element is both introduced through said surface and driven by an installer.

In an embodiment of the present disclosure, the installer when driving said element stands directly on an installed floor structure of a building of which said connection is to form a part.

In an embodiment of the present disclosure, the structural member forms part of a truss.

In an embodiment of the present disclosure, the structural member is a bottom chord of the truss.

In an embodiment of the present disclosure, the structural member is a roof frame member.

In an embodiment of the present disclosure, the truss is a roof truss or floor truss.

In an embodiment of the present disclosure, the structural member is a trimmer.

In an embodiment of the present disclosure, the trimmer extends between two trusses.

In an embodiment of the present disclosure, the wall member is a member in a frame for an internal wall.

In an embodiment of the present disclosure, said one member is said first member.

According to a tenth aspect of the present disclosure, there is provided said first and second members interconnected, or said connection formed, by or via a method according to any one of the sixth to ninth aspects.

According to an eleventh aspect of the present disclosure, there is provided a jig configured to be positioned relative to first and second members, which extend along mutually transverse first and second axes respectively and are spaced along a third axis which is transverse to the first and second axes, for locating a hole-forming element with respect to the members and guiding the thus located element along said third axis during driving of the hole-forming element into the first member whereby a hole thus formed in the first member extends along said third axis for application therethrough, axially guided by the jig so positioned and/or the hole, of a connecting element to interconnect the members, such that first and second portions of the connecting element thus applied are received at correct positions in the first and second members respectively, the jig comprising:

a locating face arranged to be received against a surface of one of the members ("one surface"), to which surface said third axis and the axis along which said one member extends ("one axis") are parallel, so as to orientate the jig correctly about a rotational axis parallel to the one axis and about a rotational axis parallel to the third axis, and to position correctly the jig along an axis perpendicular to said one surface;

an axial locator arranged to be received against a surface of the other of the first and second members ("other surface"), to which surface said third axis and the axis along which said other member extends ("other axis") are parallel, so as to position correctly the jig along said other axis; and a guide arranged to support the hole-forming element such that, when the locating face and axial locator are so received, said driving of the hole-forming element forms the hole along the third axis.

Preferably, the third axis passes through a centreline of the first member extending along or parallel to the first axis and through a centreline of the second member extending along or parallel to the second axis.

Preferably, the jig comprises a wall having a face defining said locating face.

In one preferred embodiment of the present disclosure, the axial locator is defined by or comprises a locating edge. Preferably, the locating edge is arranged, or extends parallel to the locating face, such that, substantially throughout a length thereof, it abuts said surface of said other member, so as to orientate the jig correctly about a rotational axis perpendicular to said one axis along and to the third axis. Preferably, the wall has an edge defining said locating edge.

Preferably, the jig comprises a further locator arranged to be received against a surface of the first or second member to which the third axis is transverse, so as to position the jig correctly along the third axis. Preferably, the further locator comprises a locating face ("further locating face") arranged to abut a surface of the first or second member to which the third axis is perpendicular, so as to orientate the jig correctly about a rotational axis parallel to the axis along which that member extends and about a rotational axis which is perpendicular to that rotational axis and to the third axis. Preferably, the further locator comprises a wall having a face defining said further locating face. Preferably, the further locator is arranged such that the surface it abuts is a surface of said first member ("first surface"). Preferably, the guide is supported from the further locator.

Preferably, the guide comprises at least one wall arranged to extend parallel to the third axis, axial locator or locating face for sideways receipt thereagainst of the a hole-forming element such that it precludes displacement of the hole-forming element transverse to said third axis during the driving thereof. Preferably, said at least one wall comprises surface portions which extend parallel to the third axis, axial locator or locating face and face in non-parallel directions, for sideways receipt thereagainst of the hole-forming element to preclude the transverse displacement thereof. Preferably, said at least one wall comprises walls angled one-to-another faces of which define said surface portions. Preferably, the walls angled one-to-another comprise first and second walls. Preferably, the first and second walls are mutually orthogonal and/or arranged such that the faces thereof defining said surface portions are mutually orthogonal. Preferably, either or each of the first wall and said face thereof is parallel to said locating face, whereby either or each of the second wall and said face thereof is perpendicular to said locating face.

Preferably, the axial locator extends parallel to said locating face to be received against said other surface.

In a preferred embodiment of the present disclosure, the jig is bent and/or folded from plate or a blank configured in the form of a plate.

In a preferred embodiment of the present disclosure, each of said walls comprises or is defined by a respective plate portion.

In a preferred embodiment of the first or eleventh aspect of the present disclosure, the guide walls comprise a third guide wall. Preferably, the third guide wall and one of the first and second guide walls are opposed and/or arranged such that the faces thereof defining said surface portions are opposed. Preferably, the third guide wall and the other of the first and second guide walls are mutually orthogonal and/or arranged such that the faces thereof defining said surface portions are mutually orthogonal.

In a preferred embodiment of the first or eleventh aspect of the present disclosure, the jig is bent and/or folded from plate or a blank configured in the form of a plate.

In a preferred embodiment of the first or eleventh aspect of the disclosure, each of said walls comprises or is defined by a respective plate portion.

In a preferred embodiment of the first or eleventh aspect of the disclosure, the jig comprises one or more holders to engage at least one said element such that it is held to the jig and/or a driver tool engageable with the element to drive the element.

Preferably, the, each or at least one said holder is configured to engage said tool and/or at least one said element releasably.

Preferably, the, each or at least one said holder comprises a clip.

Preferably, the, each, or at least one said, holder is resiliently deformable to engage a said element or said tool.

Preferably, the, each, or at least one said, holder is press- or snap-fittable to a said element or said tool.

Preferably, the, each, or at least one said, holder is configured to clamp or grip a said element or said tool.

Preferably, the, each or at least one said, holder comprises a living clamp to clamp a said element or said tool.

In a preferred embodiment of the present disclosure, the, each, or at least one said, holder comprises formations or projections arranged in opposing relation to be received against opposite sides of said element.

Preferably, the, each or at least one said, holder comprises clamping or gripping portions arranged in opposing relation to be received against opposite sides of said element. Preferably, said portions are defined by said formations or projections.

Preferably, the formations or projections are lateral and arranged to be transverse to an axis of the element or tool. The formations or projections may be resiliently deformable. Preferably, the formations or projections comprise ribs or lugs.

Preferably, the, each, or at least one said, holder is configured to engage a shank or axially extending portion of the element or tool.

Preferably, the, each, or at least one said, holder is arranged such that a portion of the element or tool held thereby is housed by the jig.

Preferably, the jig is preloadable or preloaded with a said element such that the element is positioned for said driving thereof. Preferably, the jig includes a said holder to engage that connecting element to be so preloaded ("preloading holder").

Preferably, a central axis of the element so positioned is coaxial with the guide axis.

Preferably, the preloading holder comprises said clamping or gripping portions and the jig includes said guide walls which are opposed defining those portions.

The preloading holder may comprise or be defined by the guide. Preferably, the preloading holder is configured to engage the connecting element at or adjacent a rear end of the guide.

Preferably, the preloading holder includes said clamping portions at or adjacent a rear end of the guide.

Preferably, the, each, or at least one said, holder is profiled to conform closely to the element or tool lengthways.

Preferably, the jig includes at least one said holder to store one or more said element(s) or tool for application to said guide ("storage holder").

Preferably, the jig includes a storage section comprising the storage holder(s).

In a preferred embodiment of the first aspect of the present disclosure, the storage section defines or comprises either or each of said first and second locators or locating face/edge(s) thereof. Preferably, an exterior of the storage section defines or comprises, or is defined by or comprised of, either or each of said first and second locators or locating face/edge(s) thereof or locating face/edge(s) thereof. Preferably, the jig is configured such that the storage section is open or openable, or accessible from, behind that/those locating face(s)/edge(s) to permit removal of the tool and/or element(s) stored thereby.

Preferably, the storage section defines or comprises the locating wall(s) defining either or each locator.

In a preferred embodiment of the eleventh aspect of the present disclosure, the storage section defines or comprises either, any or each of said axial locator and locating face(s)/edge(s). Preferably, an exterior of the storage section defines or comprises, or is defined by or comprised of, either, any or each of said axial locator and locating face(s)/edge(s). Preferably, the jig is configured such that the storage section is open or openable, or accessible from, behind said axial locator/locating face(s)/edge(s).

The jig may be moulded, preferably from plastic.

Preferably, the jig is of single-piece or unitary form.

According to a twelfth aspect of the present disclosure, there is provided a method of forming said jig, comprising:

providing plate or a blank configured in the form of a plate; and bending and/or folding the plate or blank, such that said walls are defined by respective portions of said plate or blank.

Preferably, the plate or blank comprises a portion configured to define the wall the face of which defines said locating face ("locating face-defining portion"), and a section configured to define the other wall(s), the method comprising forming a bend or fold at a junction between said locating face-defining portion and said section, such that the wall the face of which defines said locating face is defined. Preferably, said section comprises a plate portion configured to define the wall the face of which defines said further locating face ("further locating face-defining portion"). Preferably, said junction comprises or is defined by a junction between the locating face-defining portion and the further locating face-defining portion.

Preferably, said section comprises a section bendable or foldable to define said at least one wall which the guide comprises, the method including bending or folding the bendable or foldable section to form the at least one wall. Preferably, the bendable or foldable section comprises first and second portions and the bending or folding of that section comprises forming a bend or fold at a junction between the first and second portions, such that said first and second walls are defined by the first and second portions respectively.

Preferably, the method includes forming a bend or fold at a junction between the further locating face-defining portion and the bendable or foldable section, such that the wall the face of which defines said further locating face is defined.

Preferably, the junction between the further locating face-defining portion and the bendable or foldable section comprises or is defined by a junction between the further locating face-defining portion and said first or second portion. Preferably, the junction between the further locating face-defining portion and the bendable or foldable section comprises or is defined by a junction between the further locating face-defining portion and said second portion.

According to a thirteenth aspect of the present disclosure, there is provided the jig formed by said method.

According to a fourteenth aspect of the present disclosure, there is provided a/the plate or a blank bendable and/or foldable to form a said jig, such that said walls are defined by respective portions of the plate or blank.

Preferably, the plate or blank comprises a portion configured to define the wall the face of which defines said locating face ("locating face-defining portion") and a section configured to define the other wall(s), and being bendable or foldable at a junction between said locating face-defining portion and said section, such that the wall the face of which defines said locating face is defined. Preferably, said section comprises a plate portion configured to define the wall the face of which defines said further locating face ("further locating face-defining portion"). Preferably, said junction comprises or is defined by a junction between the locating face-defining portion and the further locating face-defining portion.

Preferably, said section comprises a section bendable or foldable to define said at least one wall which the guide comprises. Preferably, the bendable or foldable section comprises first and second portions and is bendable or foldable at a junction between the first and second portions, such that said first and second walls are defined by the first and second portions respectively.

Preferably, the plate or blank is bendable or foldable at a junction between the further locating face-defining portion and the bendable or foldable section, such that the wall the face of which defines said further locating face is defined. Preferably, the junction between the further locating face-defining portion and the bendable or foldable section comprises or is defined by a junction between the further locating face-defining portion and said first or second portion. Preferably, the junction between the further locating face-defining portion and the bendable or foldable section comprises or is defined by a junction between the further locating face-defining portion and said second portion.

According to a fifteenth aspect of the present disclosure, there is provided the jig bent and/or folded from the plate or blank, said walls of the jig being defined by said respective portions of the plate or blank.

According to a sixteenth aspect of the present disclosure, there is provided a method of forming, in the former or each of first and second members extending along mutually transverse first and second axes respectively and spaced along a third axis which is transverse to the first and second axes, a hole which extends along the third axis to receive a connecting element to interconnect the members, the method comprising:

positioning a said jig according such that:
the locating face thereof is received against said one surface, whereby the jig is orientated correctly about said rotational axis parallel to the one axis and about said rotational axis parallel to the third axis, and is positioned correctly along said axis perpendicular to said one surface; and
the axial locator thereof is received against said other surface, whereby the jig is positioned correctly along said other axis; and
with the hole-forming element supported by the guide, driving the hole-forming element into or through the first member,
whereby a hole is formed along the third axis in the first member.

Preferably, the method comprises driving the hole-forming element, axially guided by the guide of the jig so positioned and/or the hole, such that it extends through a hole formed thereby along the third axis and through the first member ("the first hole") and is driven into or through the second member, to form along the third axis and in the second member a hole ("the second hole").

Preferably, said hole-forming element is a hole-forming tool and is removed from the hole(s) after the formation thereof. Preferably, said hole-forming tool is a rotatable drilling or boring tool, and the method includes rotating the tool during the driving thereof so as to form said hole(s). Preferably, said tool is coupled to or forms part of a powered machining apparatus, and the method includes operating the apparatus to rotate and drive said tool to form said hole(s).

According to a seventeenth aspect of the present disclosure, there is provided a method of interconnecting first and second members extending along mutually transverse first and second axes respectively and spaced along a third axis which is transverse to the first and second axes, the method comprising:
forming a hole in the former (first) or each of the first and second members by a method according to the sixteenth aspect; and
with the hole-forming element removed from the hole(s), applying said connecting element, axially guided by the guide of the jig so positioned and/or by said hole or either or each of the first and second holes, through said hole or the first hole, to the members to interconnect them, such that first and second portions of the connecting element thus applied are received at correct positions in the first and second members respectively.

Preferably, applying said connecting element comprises directing it through the first member, along said hole therein, and thence directing it into or through the second member. Preferably, directing the connecting element through the first member comprises driving it within or through the first member along the third axis.

Directing the connecting element through the first member may comprise slotting or sliding it within or through said hole.

Preferably, directing the connecting element into or through the second member comprises driving it within or through the second member along the third axis. Preferably, the driving of the connecting element within or through the second member along the third axis is axially guided by said hole.

Preferably, directing the connecting element into or through the second member comprises directing it along the second hole. Preferably, directing the connecting element into or through the second member comprises driving it within or through the second member along the third axis.

Preferably, directing the connecting element into or through the second member comprises slotting or sliding it within or through said second hole.

According to an eighteenth aspect of the present disclosure, there is provided a method of interconnecting first and second members extending along mutually transverse first and second axes respectively and spaced along a third axis which is transverse to the first and second axes, the method comprising forming a hole in each of the first and second members by a method which accords with the sixteenth aspect and which comprises driving the hole-forming element, axially guided by the guide of the jig so positioned and/or the hole, such that it extends through a hole formed thereby along the third axis and through the first member ("the first hole") and is driven into or through the second member, to form along the third axis and in the second member a hole ("the second hole"), said method of interconnecting first and second members including applying the connecting element to the members such that it interconnects them, wherein the hole-forming element defines or is said connecting element, whereby the applying of the connecting element comprises the driving of the hole-forming element through the first member and into or through the second member to effect receipt of first and second portions of the connecting element at correct positions in the first and second members respectively.

Preferably, the method is such that the driving of the hole-forming element through the first member and into or through the second member effects application of the connecting element such that it interconnects the members.

According to a nineteenth aspect of the present disclosure, there is provided a method of interconnecting first and second members extending along mutually transverse first and second axes respectively and spaced along a third axis which is transverse to the first and second axes, the method comprising:

positioning a said jig such that:

the locating face thereof is received against said one surface, whereby the jig is orientated correctly about said rotational axis parallel to the one axis and about said rotational axis parallel to the third axis, and is positioned correctly along said axis perpendicular to said one surface; and the axial locator thereof is received against said other surface, whereby the jig is positioned correctly along said other axis; and with the hole-forming element supported by the guide, driving the hole-forming element along said third axis into or through the first member; and further driving the hole-forming element, such that it is driven along said third axis into or through the second member, wherein the hole-forming element defines or is said connecting element, whereby the driving of the hole-forming element through the first member and into or through the second member effects receipt of first and second portions of the connecting element at correct positions in the first and second members respectively.

In one embodiment of the present disclosure, the method includes removing the jig after driving of the hole-forming element into or through the first member and prior to said further driving. The further driving of the hole-forming element preferably comprises driving the hole-forming element, supported by the guide of the jig so positioned. Preferably, the method is such that the driving of the hole-forming element through the first member and into or through the second member effects application of the connecting element such that it interconnects the members. Preferably, the connecting element or the element defining it comprises a fastener. Preferably, Preferably, Preferably, the fastener is a threaded fastener.

Preferably, the connecting element or the element defining it comprises a shank arranged to extend along said third axis and either or each of the first and second portions is defined on or by the shank.

Preferably, the applying of the connecting element comprises, with a driver:

driving the connecting element, or the hole-forming element defining it, in and/or through the first member; and/or driving the connecting element, or the hole-forming element defining it, in and/or through the second member.

Preferably, the driver is powered.

Preferably, the driving of the connecting element or the element defining it comprises rotating the element about an axis thereof which is parallel or coaxial with said third axis. Preferably, the driver is a screw driver or screw-driving device.

Preferably, either or each member can move relative to the other in a direction comprising a component along said third axis, and the connecting element is configured such that first and second portions thereof form, with the first and second members respectively, fits permitting relative movement between the members along or parallel to said third axis and precluding relative translational movement between the members orthogonal to the third axis, whereby there is defined a floating connection between the members interconnected via the connecting element, whereby loading perpendicular to the third axis in either member is transferred to the other member. Preferably, the applying of the connecting element is such that the first and second portions thereof form said fits, whereby there is defined said floating connection. Preferably, said third axis is substantially upright.

Preferably, the connecting element is rigid.

Preferably, the connecting element is secured to one of the members so as to be anchored to that member ("the anchoring member") such that it projects from that member, along the third axis, into the other member to be received by that other member ("the receiving member"). Preferably, there is formed, between the element and said receiving member, a sliding fit which permits relative movement between the element and said receiving member parallel to the third axis but precludes relative translational movement between said element and said receiving member perpendicular to the third axis, thereby allowing either or one of the members to move parallel to the third axis but transferring, from that member to the other or vice versa, loads perpendicular to the third axis so as to brace the member from which it transfers the loads.

Preferably, the members comprise a wall member and a structural member respectively. Preferably, the wall member is a top plate of a wall frame.

Preferably, said element is introduced through a surface of said first member which faces away from said second member, so as to extend through said first member, and thence driven into said second member.

Preferably, the fastener is elongate along said axis.

Preferably, the fastener is threaded. Preferably, the fastener is self-tapping and driven through said first member so as to form therethrough a passage in which it extends in said connection. Preferably, the fastener has a threaded portion and a threadless portion between the threaded portion and a trailing end of the fastener, and is driven through said first member such that in the connection, the threaded portion is disengaged from said first member and the threadless portion extends in the passage so as to be able to slide axially therein, thus defining said first portion. Preferably, the fastener comprises a reaming portion, between the threaded portion and the threadless portion, which reams said first member during driving of the fastener and is passed through said first member so as to be spaced therefrom in said connection. Preferably, the reaming portion is not smaller in cross-section than the threadless portion.

Preferably, the reaming portion is larger in cross section than the threadless portion.

Preferably, the reaming portion is not smaller in cross-section than the trailing end, and the fastener is driven through said one member such that the trailing end is contained in said passage. Preferably, the reaming portion is larger in cross section than the trailing end.

Preferably, the trailing end is not larger in cross-section than the threadless portion, and the fastener is driven through said first member such that the trailing end is contained in said passage. Preferably, the trailing end and threadless portion are equally sized in cross section.

Preferably, the trailing end is configured with at least one formation arranged to be engaged by the driver, or a tool which is part of or coupled to the driver, to effect the driving of the fastener. Preferably, the or each formation is defined by a recess formed through a trailing face of the trailing end.

Preferably, said second member is said structural member.

Preferably, the structural member is arranged above the wall member.

Preferably, said surface is an underside surface of said wall member. Preferably, said element is both introduced through said surface and driven by an installer. Preferably, the installer when driving said element stands directly on an installed floor structure of a building of which said connection is to form a part.

In a preferred embodiment of the present disclosure, the structural member forms part of a truss. Preferably, the structural member is a bottom chord of the truss.

Preferably, the truss is a roof truss or floor truss.

In a preferred embodiment of the present disclosure, the structural member is a roof frame member.

In a preferred embodiment of the present disclosure, the structural member is a trimmer. Preferably, the trimmer extends between two trusses.

Preferably, the wall member is a member in a frame for an internal wall.

Preferably, said one member is said first member.

In a preferred embodiment of the eighth, ninth, eighteenth or nineteenth aspect of the present disclosure, the method includes removing the element from a said holder of the jig, prior to driving the element supported by the guide.

In a preferred embodiment of the present disclosure, driving of the element is effected using said driver tool, and the method includes removing the tool from a said holder of the jig, prior to said driving. The method may include coupling the removed tool to a driver and operating the driver to drive, via the tool coupled thereto, the element.

In a preferred embodiment of the present disclosure, the jig is preloaded with a said element such that the element is positioned for said driving thereof. Preferably, the jig includes said preloading holder, and the element, prior to driving thereof, is brought into engagement with the preloading holder.

According to a twentieth aspect of the present disclosure, there is provided said first and second members interconnected, or said connection formed, by or via a method according to any one of said sixteenth to nineteenth aspects.

BRIEF DESCRIPTION OF THE DRAWINGS

The present disclosure will now be described, by way of non-limiting example only, with reference to the accompanying drawings in which:

FIG. 17A is a plan view of a blank bendable/foldable to form the jig in accordance with the second embodiment;

FIG. 17B is a further plan view of the blank shown in FIG. 17A;

FIG. 17C is a plan view showing "Detail B" labelled in FIG. 17B,

FIGS. 20A to 20F are, respectively, upper front, upper rear, front elevation, rear elevation, partial front perspective and bottom views of a jig according to a third embodiment of the present disclosure, and a driver tool and connecting elements held thereby;

FIGS. 21A and 21B are front and rear elevation views of the jig of the third embodiment;

DETAILED DESCRIPTION

Each of the floating connections shown in FIGS. 1, 2, 3A and 3B is between a first member, namely a top plate of a wall frame to form part of a building, which may be the frame of a non-load bearing wall (typically an internal wall), and a second member, namely a roof frame member, positioned so as to lie in a ceiling plane/diaphragm of the building.

Figure 1:
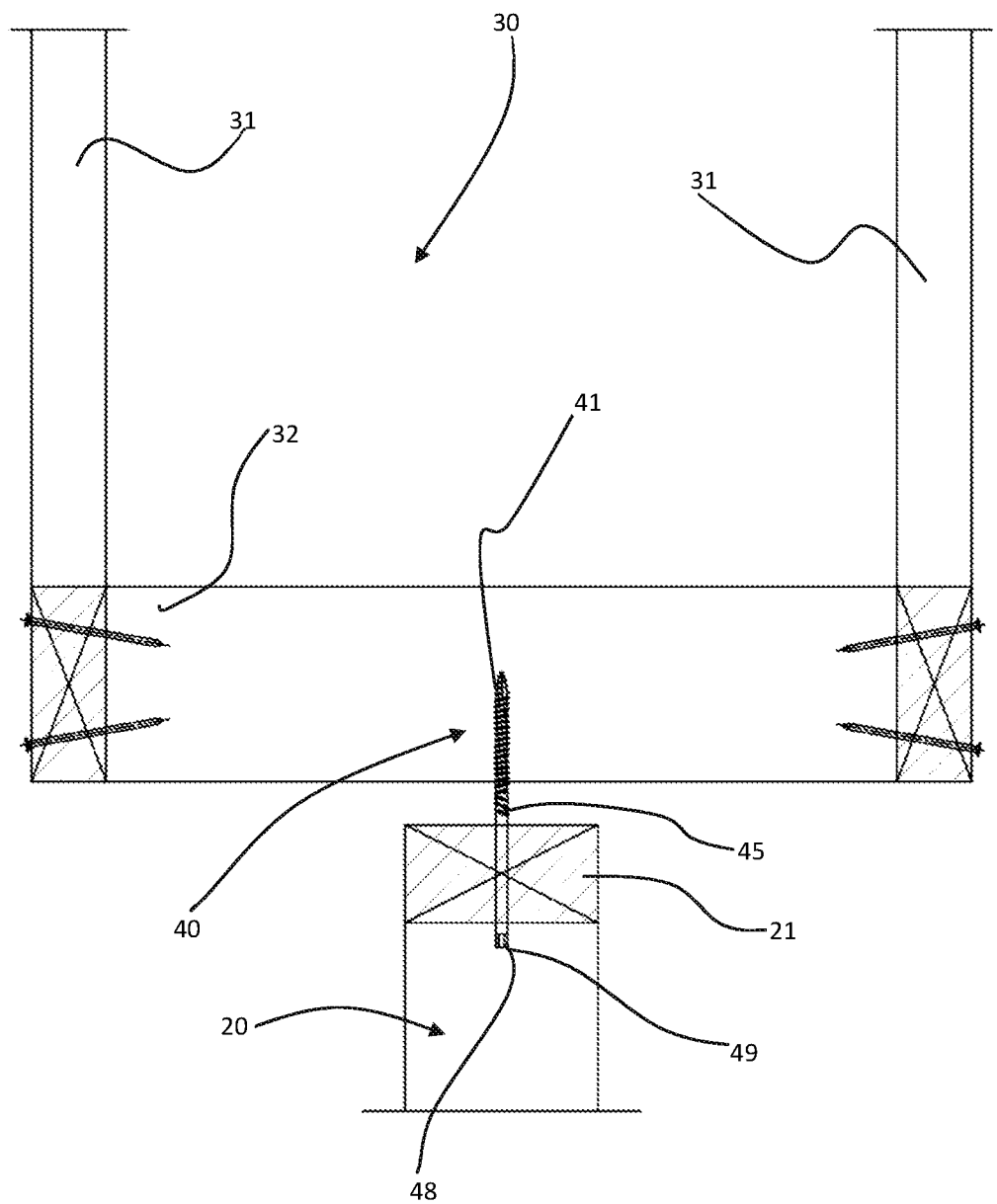
FIG. 1 is a schematic elevation view showing a floating connection between a trimmer and wall frame top plate formed in accordance with a preferred embodiment of the present disclosure.

Shown in FIG. 1 is a timber wall frame 20, which includes a top plate 21, a timber roof frame 30, which includes parallel trusses 31, the planes of which are parallel to the wall/top plate 21, and a trimmer 32 extending horizontally between the trusses 31 so as to interconnect them, the trimmer 32 being arranged to form part of the ceiling diaphragm. Either or each of the top plate 21 and trimmer 32 is to be exploited to brace the other against horizontal loading/movement—being, in the case of the trimmer 32 being braced, axial or transverse loading/movement in the trimmer 32, and, in the case of the top plate 21 being braced, lateral loading against the wall of which wall frame 20 is to form a part—but the trimmer 32 must remain permitted to move vertically relative to the top plate 21, including in particular when a camber with which each of the trusses 31 is pre-formed dissipates under the weight of a roof covering when applied over the roof frame 30. To this end, a fastener, comprising a screw 40, is driven vertically upwards through the top plate 21 and into the trimmer 32 such that it is movable vertically/axially in the former (and slidable in the former should it come into contact therewith) but is fixed to the latter. The screw 40 is self-tapping and has a sharp tip 41 and, referring to FIG. 5 (which shows parts of the screw 40 in further detail), a shank 42 configured with a threaded portion 43 including at least one thread 44, a reamer portion 45 comprising helical threads 46 regularly spaced around the shank circumference, and a threadless portion 47, the diameter of which is smaller than the (maximum) diameter of the reaming portion (being a distance between radially outermost extents of diametrically opposed ones of the threads 46) and the (maximum) diameter of the threaded portion 43 (being the outer diameter of the thread(s) 44).

Referring again to FIG. 1, the screw 40 is headless, whereby a trailing end 48 thereof has a diameter equal to the diameter of the threadless portion 47 of the shank 42. The trailing portion 48 is formed with an end 49 having a configuration (e.g. hexagonal or cross-shaped) which is such that it can be received by a complementarily shaped cavity or socket of a driving tool (described in further detail later) whereby the screw 40 can be driven up through the top plate 21, as shown in FIG. 1, by the tool. Instead, without departure from the present disclosure, it may be the trailing portion 48 that is provided with such a (e.g. hexagonal or cross-shaped) cavity/socket—formed through a trailing face of that portion—and the tool provided with the complementarily shaped portion/head receivable by that cavity. The screw 40 is driven through the top plate 21 such that the threaded portion 43 and the reamer portion 45 which follows it pass fully through the top plate 21, the reamer portion thus cleaning out the hole created by the threaded portion 43, whereby the threadless portion 47, which extends in the hole/passage once the screw 40 has been driven fully home, can be displaced axially in the hole/passage (when the trimmer 32 moves vertically) but will contact the cylindrical face bounding the passage if displaced horizontally to even a very small extent (on average, half the difference between the smooth shaft diameter of the screw and the diameter of the reamer portion) as a result of horizontal loads on/in the trimmer 32.

Figure 2:
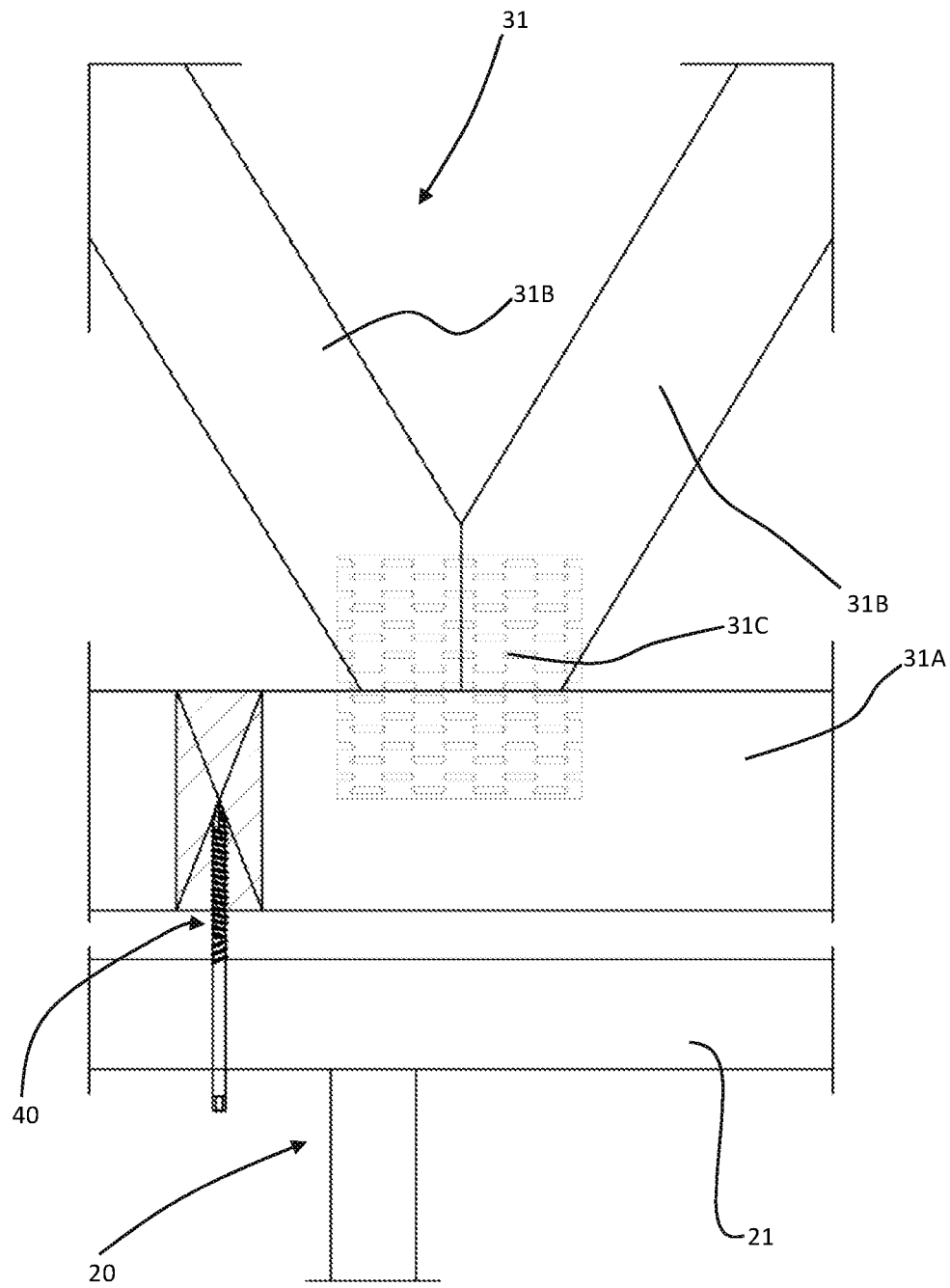
FIG. 2 is a schematic elevation view showing a floating connection between a truss bottom chord and wall frame top plate formed in accordance with another preferred embodiment of the present disclosure.
Figure 3A:
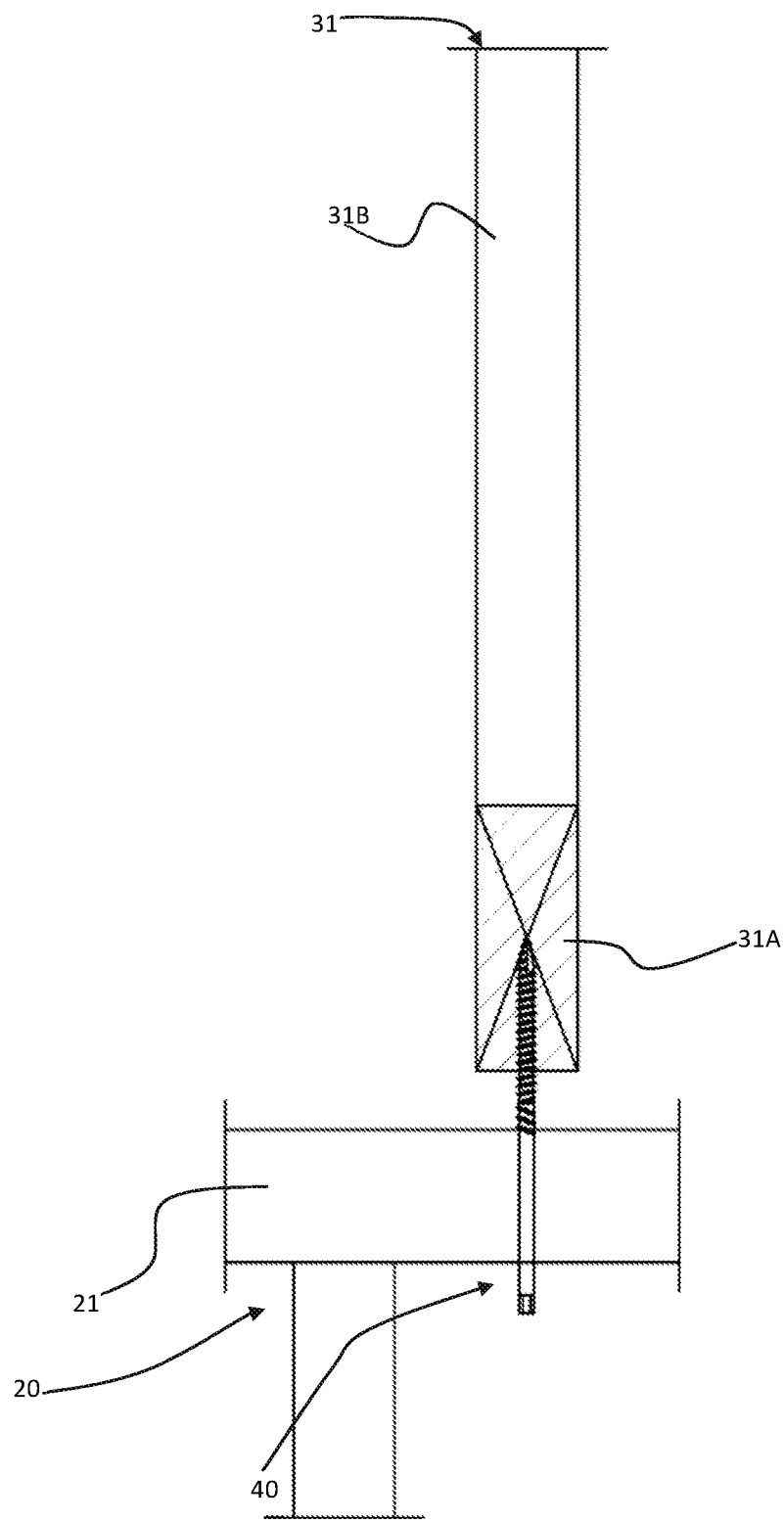
FIG. 3A is a schematic elevation view showing a floating connection between a truss bottom chord and wall frame top plate formed in accordance with yet another preferred embodiment of the present disclosure, as seen side-on to the top plate.
Figure 3B:
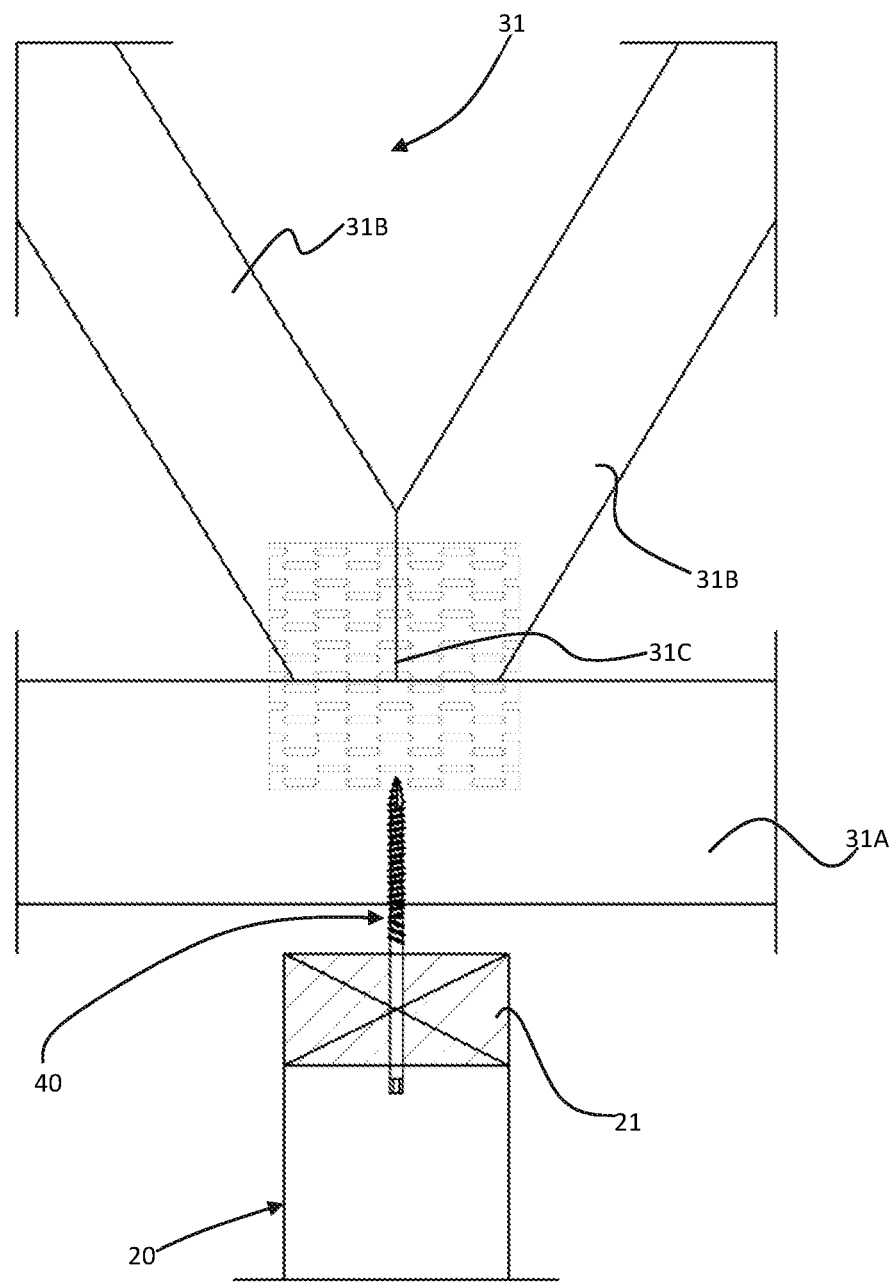
FIG. 3B is a schematic elevation view of the connection shown in FIG. 3A as seen side-on to the truss.
Figure 4:
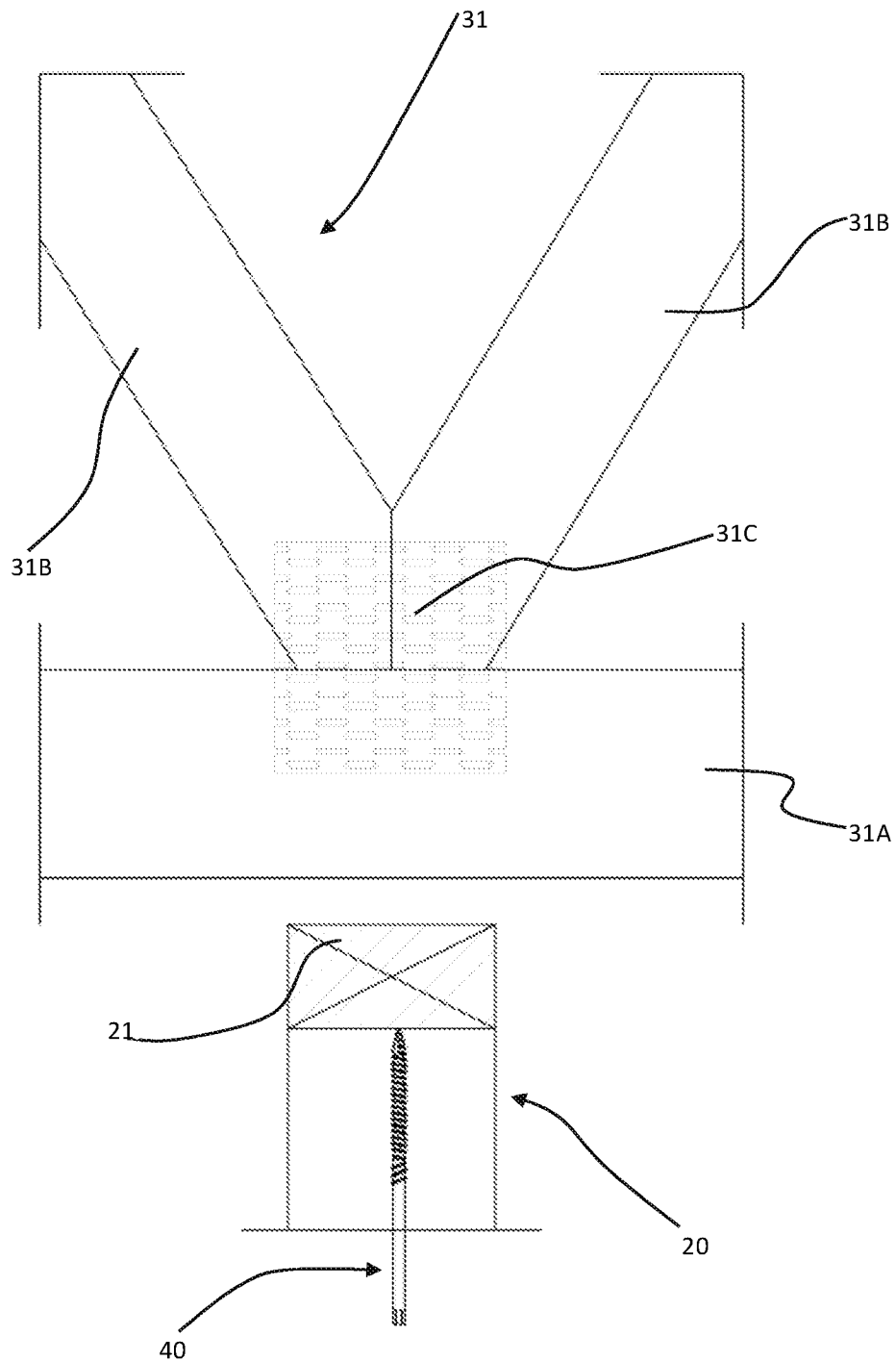
FIG. 4 shows positioning of a headless fastener immediately before it is driven through a wall frame top plate to establish a floating connection between that top plate and a bottom chord of a truss in accordance with an embodiment of the present disclosure.

In the embodiment described with respect to FIG. 1, the floating connection is between the top plate 21 and a trimmer 32 which extends perpendicular to the top plate 21 and interconnects trusses 31 planes of which are parallel to the plane of the wall frame 20/wall (that trimmer being a said roof frame member). Referring to FIG. 2, a floating connection formed in accordance with an alternative preferred embodiment of the present disclosure can be between the top plate 21 and a bottom chord 31A of a truss 31 itself (that chord being a said roof frame member), the truss 31 including webs 31B and a nail plate 31C connecting the webs 31B to the bottom chord 31A, the plane of the truss 31, like that of each of the trusses 31 shown in FIG. 1, being parallel to the plane of the wall frame 20/wall. Referring to FIGS. 3A and 3B, the truss 31 may, instead of being arranged such that the plane thereof is parallel to and coplanar with the plane of the wall frame 20/wall, be arranged such that its plane is perpendicular to the plane of the wall frame 20/wall without departure from the present disclosure, the screw 40, again, being introduced through the underside of the top plate 21 as shown in FIG. 4.

Figure 6A:
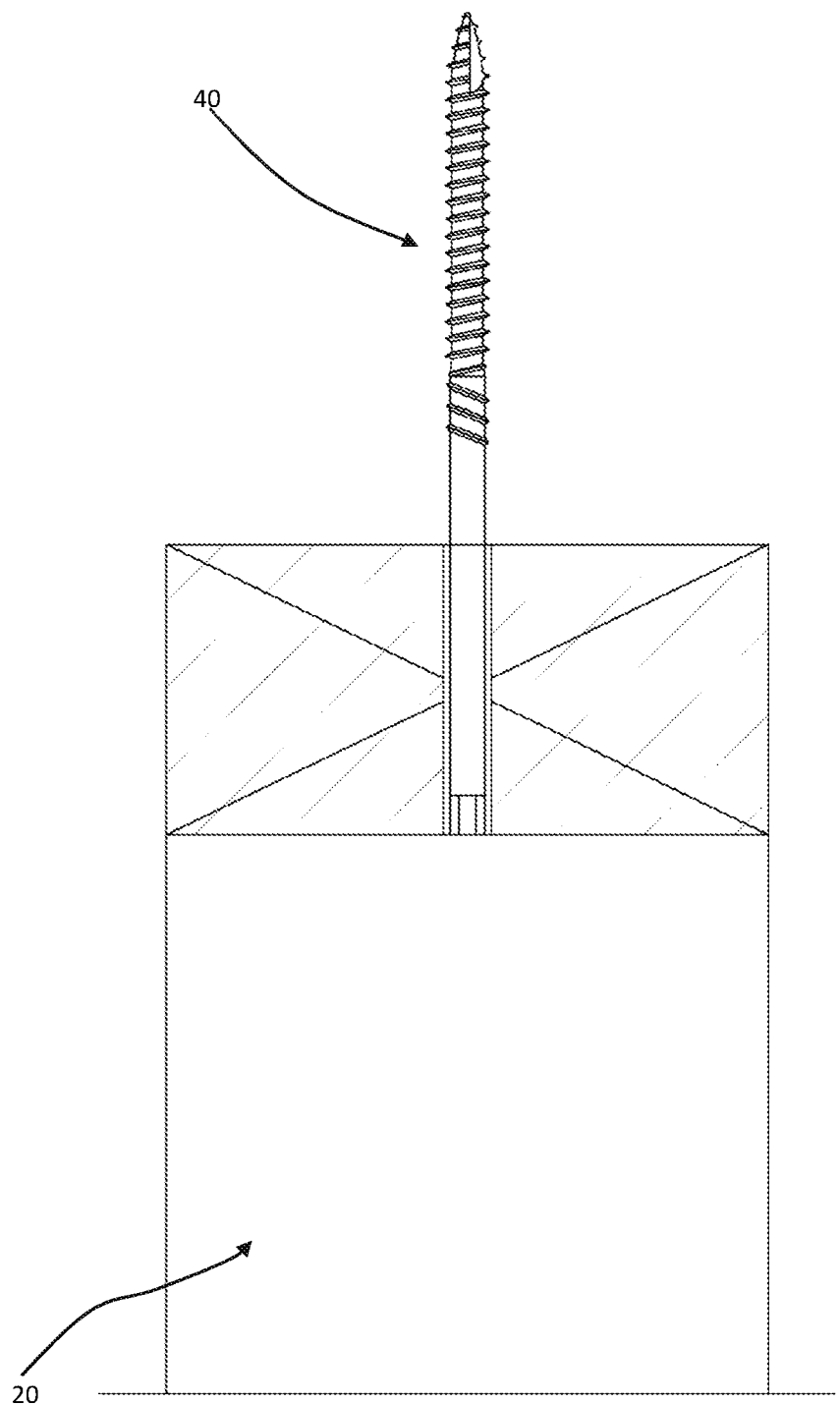
FIGS. 6A to 6C show varying positions the fastener may assume relative to the top plate in a connection according to any one of particularly preferred embodiments of the present disclosure.
Figure 6B:
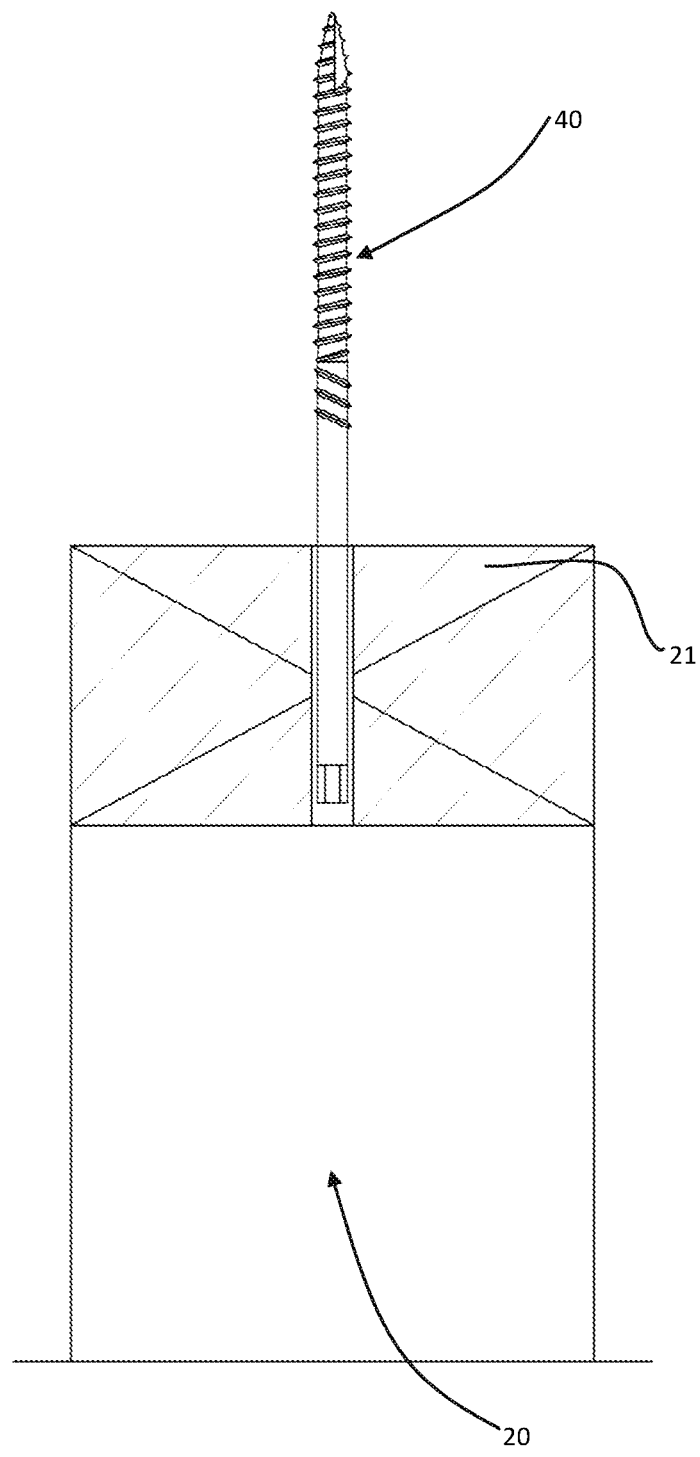
Figure 6C:
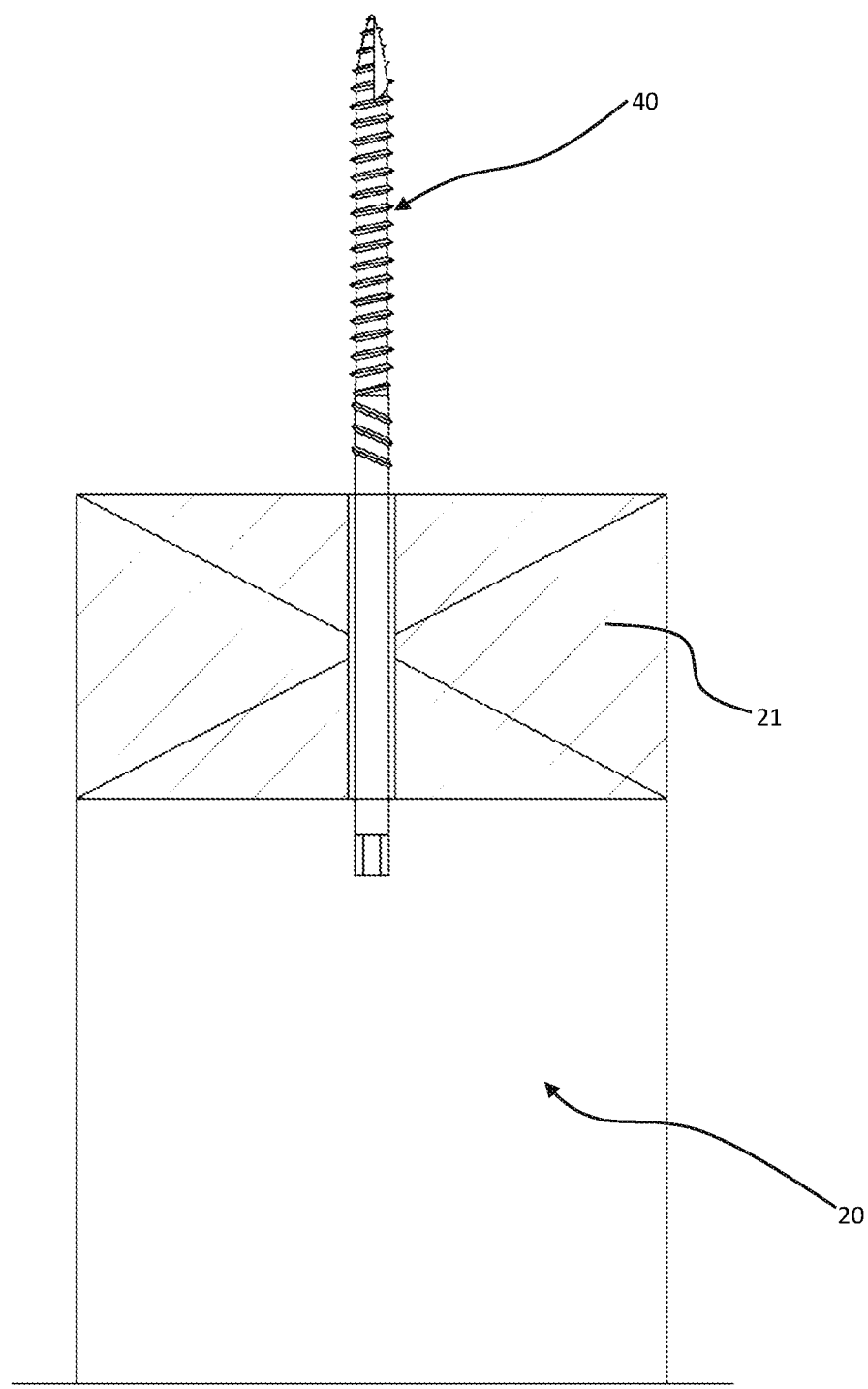
Figure 7:
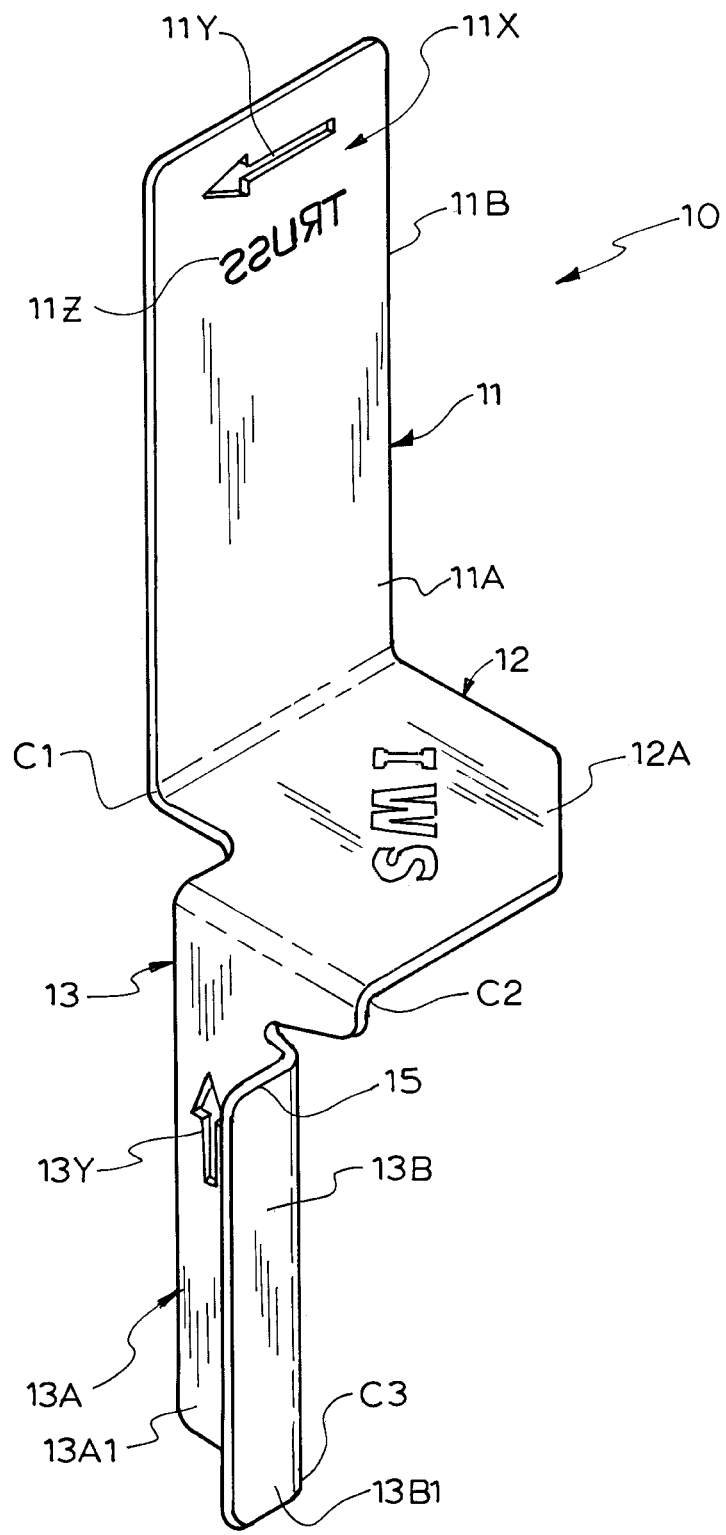
FIG. 7 is a rear/side perspective elevation view of a jig according to a first embodiment of the present disclosure, for applying the fastener such that it is correctly positioned/orientated in the connection.
Figure 8:
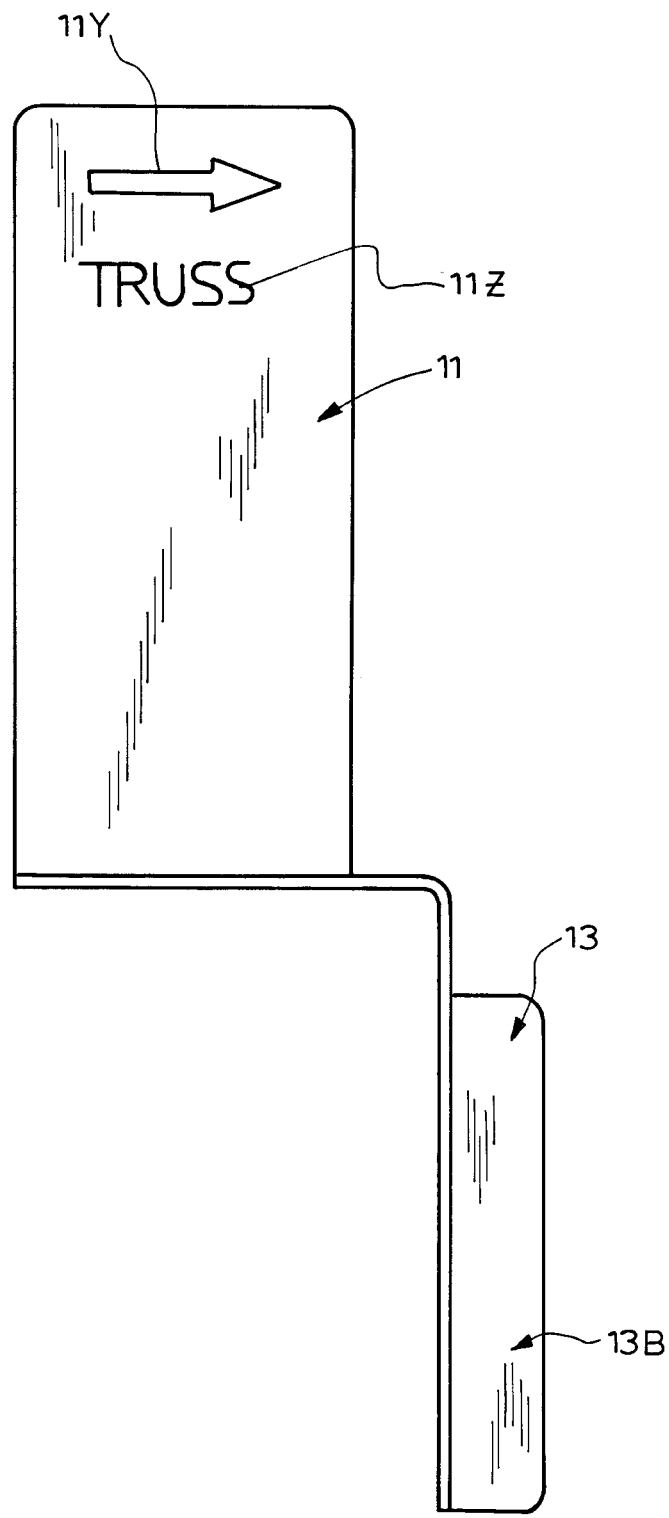
FIG. 8 is a front elevation view of the jig of the first embodiment.
Figure 9:
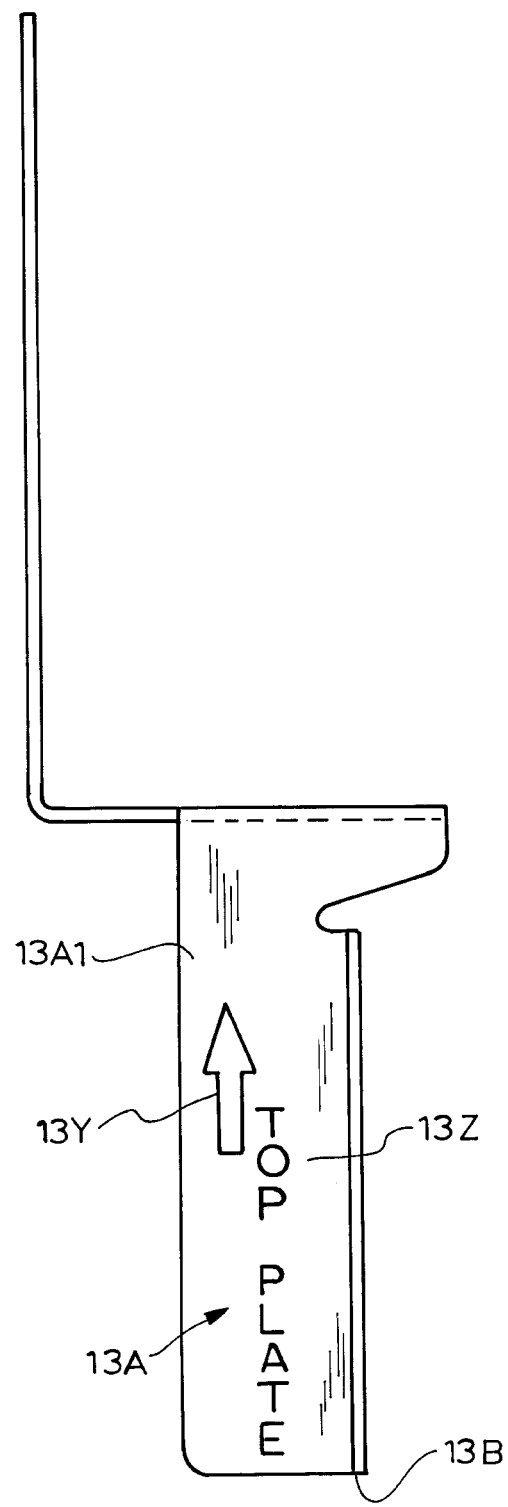
FIG. 9 is a side elevation view of the jig of the first embodiment.
Figure 10:
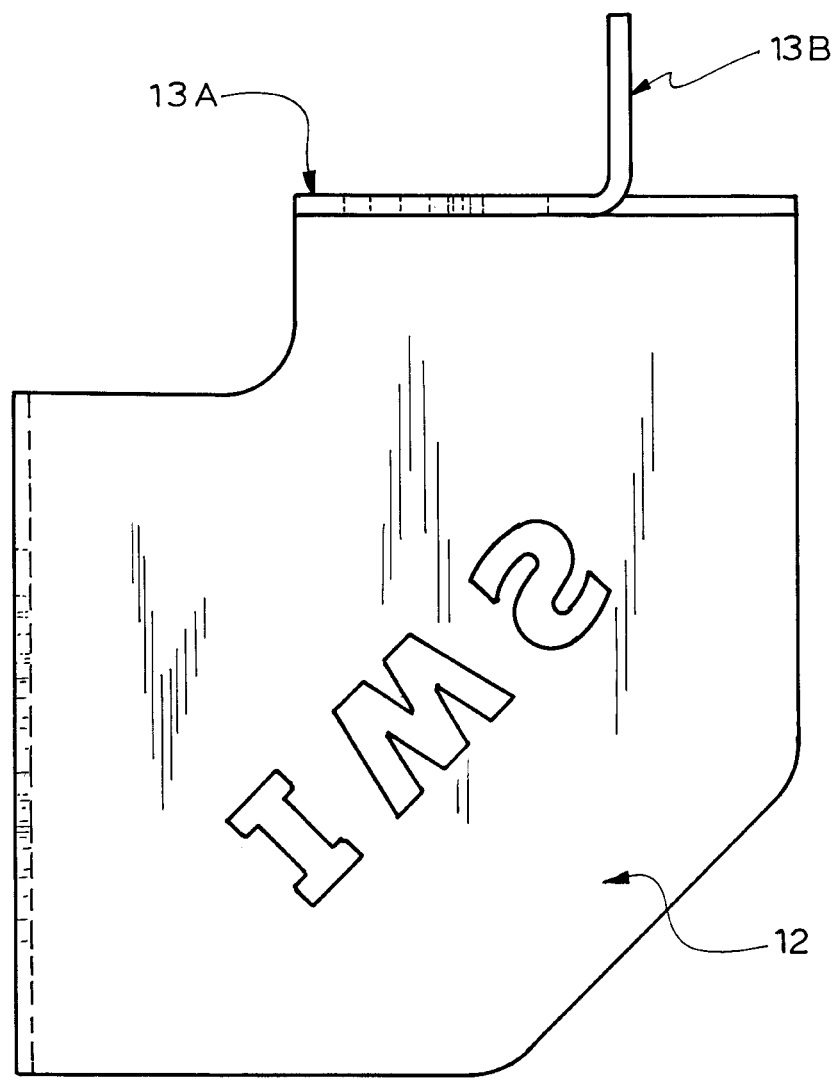
FIG. 10 is an underneath view of the jig of the first embodiment.

Advantageously, owing to the screw 40 being headless, its being able to float with respect to the top plate 21 is assured, including when the screw 40 is driven so far that the trailing end 48 thereof is, or during service becomes, coincident with the lower surface of the top plate 21 or disposed within the passage formed through the top plate 21, as shown in FIGS. 6B and 6C respectively, there being no screw head to foul against the top plate 21. In fact, owing to the headless configuration of the trailing end 48, the position of the trailing face of that end relative to the bottom face of the top plate 21 can serve as an indicator, to the installer, of whether the degree to which the screw 40 has been passed through the top plate 21 is inappropriate (in particular, insufficient) or appropriate. More specifically, the lengths of the threaded portion 43, reamer portion 45 and threadless portion 47 may be set such that the trailing face of the trailing end 48 becoming flush with the lower surface of the top plate 21, as shown in FIG. 6A, can indicate that the screw 40 has been passed through the top plate 21 and driven into the trimmer or bottom chord to an appropriate/sufficient extent. The trailing end/face being recessed in the passage, as shown in FIG. 6B, may result from downward displacement of the section of top plate through which the passage is formed, for example where the wall frame of which the top plate is a part is supported on an underlying slab (as is typical) and there is a reduction in the level of a middle region of the slab directly below the said section (such a reduction not being unusual). The trailing end/face being proud of the top plate lower surface, as shown in FIG. 6C, can, where the screw has only just been driven, be an indication that the screw 40 has been underdriven, or can be the result of displacement of either or each of the top plate and bottom chord/trimmer relative to the other—e.g. resulting from deflection of (typically pre-camber dissipation in) the trimmer or bottom chord upon loading being taken through the trusses which the trimmer interconnects or the truss of which the bottom chord forms a part, respectively—whereby the separation between the two has been reduced.

Figure 19:
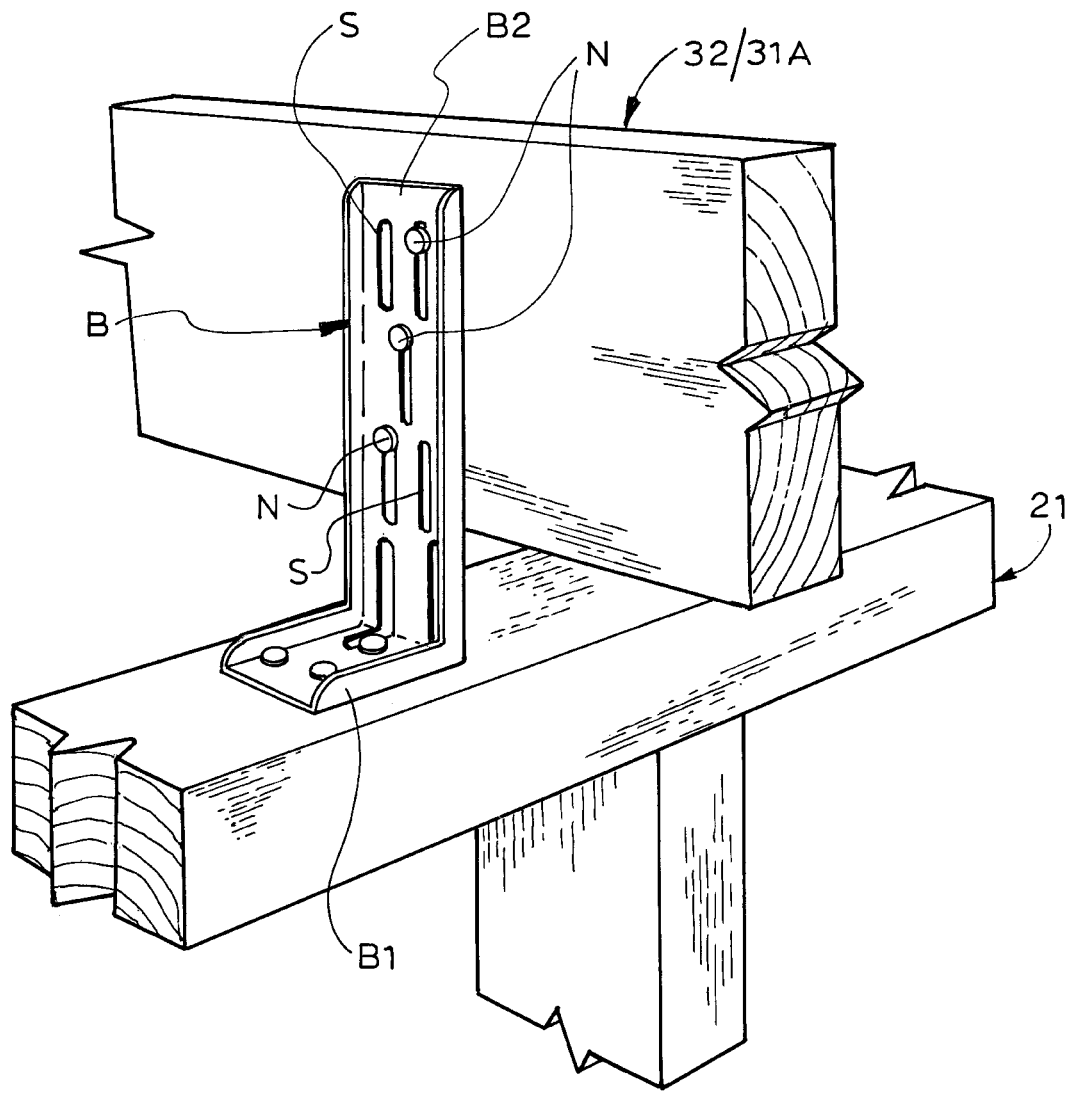
FIG. 19 is a perspective view showing a known kind of floating connection between a trimmer or truss bottom chord and a top plate.

Advantageously, the floating connection not only is readily inspectable for determining whether the screw 40 has been sufficiently driven into the trimmer/bottom chord, but also permits the separation between the top plate and the bottom chord/trimmer to increase or decrease. The floating connection and the formation thereof provide improvements over earlier types of floating connection. A connection of one such earlier type, shown in FIG. 19, comprises a "partition hitch", consisting of an L-shaped bracket B one section B1 of which is nailed to the top of the top plate 21 and the other section B2 of which is nailed against a side of the trimmer 32/bottom chord 31A, the shanks of the nails N which are received through the latter section and into the trimmer 32/bottom chord 31A extending through respective slots S in that section, for the purposes of permitting relative vertical movement between those nails/the trimmer/bottom chord and the bracket/top plate. Typically, those nails N, during formation of the connection, are positioned at/near the top ends of the slots S, such that they will, following deflection of/camber dissipation in the trimmer/bottom chord as mentioned above, assume positions at intermediate locations therealong. If these nails N are driven excessively into the trimmer 32/bottom chord 31A, the heads thereof will foul against the slotted bracket section B2, whereby the bracket B can buckle and the said relative movement is inhibited or precluded. Also, if any one of these nails N is excessively spaced from the top end of the slot S through which it passes, the shank thereof will "bottom out" in the slot S, thus fouling against the slotted section B2 of the bracket B—upon said deflection/dissipation and/or when the connection is in service, such that, likewise, the bracket B may buckle and the said relative movement is inhibited or precluded.

Figure 5:
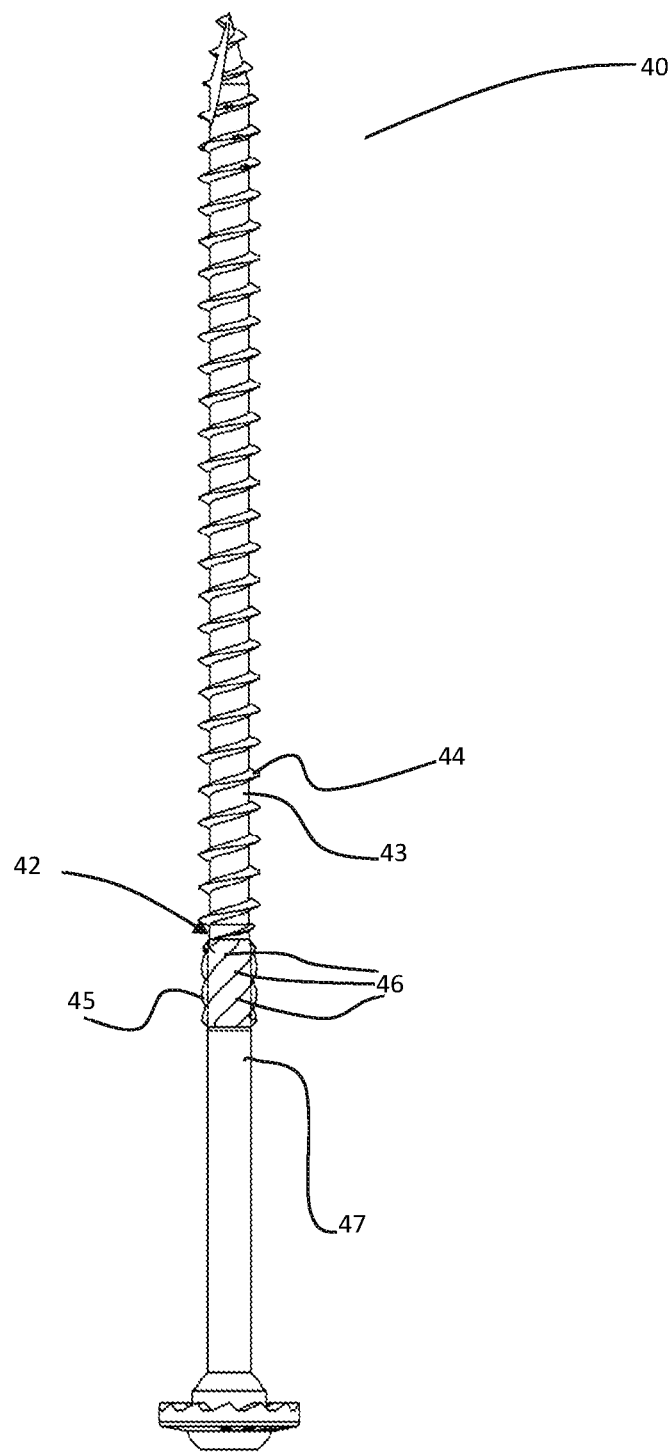
FIG. 5 shows details of a headed fastener, which can instead be used to form a said floating connection, a threaded portion, reamer portion and threadless portion of the headed fastener being the same as such portions in the headless fastener.

The fastener could, without departure from the present disclosure, instead comprise a screw 40' configured with a head, as shown in FIG. 5, and installed such that the head is sufficiently clear of the underside of the top plate 21 so as not to preclude upward displacement of the trimmer 32.

Also, without departure from the present disclosure, the screw 40/40' could lack a reamer portion, whereby the threadless portion would lie immediately adjacent the threaded portion, especially if the threadless portion were to have a diameter slightly less than that of the shank of the threaded portion.

In an alternative embodiment of the present disclosure, the fastener 40/40' is, instead of being driven upwardly through the top plate 21, whereby it is fixed in the trimmer or bottom chord overlying that top plate 21, driven downwardly, through the trimmer or bottom chord such that it becomes fixed in the top plate 21, whereby the hole/passage is instead formed in the trimmer/bottom chord and the trimmer/bottom chord can thus float up and down with respect to the fastener (which remains stationary owing to it being secured to the top plate 21). Such an embodiment might be invoked, for example, where a stud or other member obscures the top plate from below, precluding driving of the fastener upwardly through it, or where the trimmer or bottom chord is steel (and the wall member is timber).

That said, the driving of the fastener upwardly through the top plate 21, where possible, is particularly advantageous because of ease of installer access beneath the top pate 21 and ease of siting of the appropriateness of the degree to which the fastener has been driven (as described above). The upward driving of the fastener from below can also, particularly given that there is a common availability of extended-length screw tools, eliminate the need for the installer to use a ladder to install the screw(s) to form the each/connection embodying the present disclosure, perhaps even permitting installer to stand on the floor to install the screw(s).

The strength of the load transfer element defined by a given screw 40/40' can be varied by varying the gauge of the screw. Also, the spacings of screws 40/40', forming respective connections embodying the present disclosure, along the wall member can vary according to the degree of shear transfer required at particular positions along the wall member.

The formation of connections embodying the present disclosure as described above with reference to the drawings, advantageously, is far more rapid than formation of conventional connections, requires only a single part/element (defined by the fastener) to form the connection (there being no bracket and nails to this end), and is practically foolproof, given in particular that an appropriate degree of driving of the fastener can be visually determined, as described above, and that function of the connection is not compromised if the fastener is underdriven, as also described above.

Also, it is conceivable (though less common) that, without departure from the present disclosure, the structural member, from which horizontal loads are to be transferred into the wall or into which horizontal loads are to be transferred from the wall, will pass through the wall, in which case that member will be arranged below the top plate 21.

It is to be appreciated that, without departure from the present disclosure, the structural member, though commonly a roof truss member or trimmer, could be another member, e.g. a hanging beam, ceiling joist, ceiling batten, intermediate ceiling joist or floor truss. It is also to be appreciated that, without departure from the present disclosure, the wall member, though commonly a wall frame top plate, could likewise be another member, e.g. a lintel, stud or nog.

Figure 11:
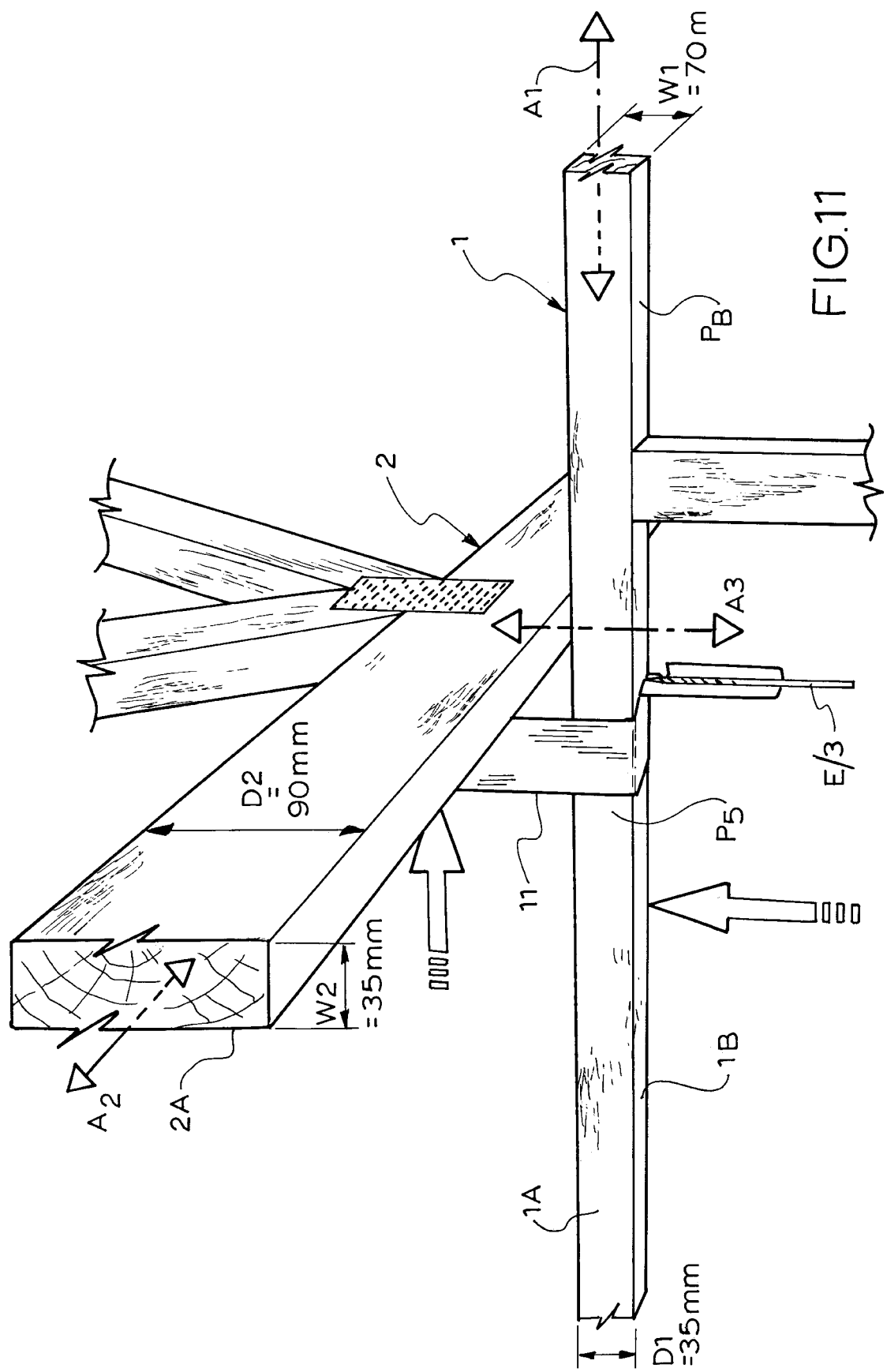
FIG. 11 is a perspective view showing positioning of the jig of the first embodiment relative to a top plate and truss bottom chord for application of the fastener therewith.

Shown in FIGS. 7 to 10 is a jig 10 according to a first embodiment of the present disclosure which, referring to FIG. 11, is configured to be positioned relative to the first member (1) and second member (2), which members extend, respectively, along a first axis A1 and a second axis A2 that are mutually perpendicular, and are spaced along a third axis A3 which is perpendicular to the first and second axes A1, A2 and passes through centrelines of the first member 1 and second member extending along/parallel to those axes respectively, for locating a hole-forming element E—typically the fastener (3)/screw 40 (which defines a connecting element), as illustrated, but possibly a drill bit to form a pilot or starter hole therefor—with respect to the members 1, 2 and for guiding the thus located element E along the third axis A3 during driving of the element E into the first member 1, whereby the element E/hole extends along the axis A3 in the first member 1, such that the connecting element 3, during application thereof to the members 1, 2, is guided—by the jig 10 (and possibly also the deepening hole it forms), during said driving, in the case of the element E being the connecting element 3, or by the hole, subsequent to said driving, in the case of the element being a pilot/starter hole-forming tool (such as a drill tool/bit)—as it is applied to the members 1, 2, thereby assuming the correct position and orientation therein.

The jig 10 is bent or folded from a blank 100, shown in FIG. 13, configured in the form of a plate (and described in further detail later). The jig 10 comprises a horizontally locating wall 11, a vertically locating wall 12, perpendicular to wall 11 and from a lateral side of which the wall 11 projects, and a guide 13, projecting perpendicular to the wall 12, from an end thereof, in a direction opposite to that in which the wall 11 projects. The wall 11 defines on one side thereof a flat locating face 11A arranged to be (as shown in FIG. 11) received against an upright side surface 1A of the member 1, thus orientating the jig 10 (and guide 13) correctly about a rotational axis in a plane Ps of side surface 1A and parallel to axis A3, and positioning correctly the jig 10 along an axis parallel to axis A2/perpendicular to the plane $P_S$. The wall 12 defines on one side thereof a flat locating face 12A arranged to be (as also shown in FIG. 11) received against a bottom surface 1B of the member 1, thus orientating the jig 10 (and guide 13) correctly about a rotational axis in a plane $P_B$ of surface 1B and parallel to axis A2, and positioning the jig 10, and in particular the guide 13, correctly along an axis parallel to axis $A_3$/perpendicular to the plane $P_B$. Either or each of the walls 11 and 12, when the faces 11A and 12A thereof are received against surfaces 1A and 1B respectively, additionally serves to orientate the jig 10 correctly about a respective one of rotational axes, in planes $P_S$ and $P_B$ respectively, parallel to axis $A_1$. The wall 11 has an upright edge 11B which extends perpendicular to face 12A and can be, when the faces 11A and 12A thereof abut surfaces 1A and 1B respectively, arranged in abutment with an upright side surface 2A of member 2—typically by sliding of the jig 10 (towards member 2) along member 1 (as shown by the sideways arrow in FIG. 11)—thereby correctly locating the jig along axis Ai, whereupon the jig 10 is located in position ("correctly located"), such that guide 13 is correctly orientated rotationally and correctly positioned translationally to locate the element relative to the members 1, 2.

The wall 11 defines a first locator, comprising the face 11A, which, owing to its thus engaging the member 1 lengthways, i.e. along an axis (on side face 1A) that is parallel to the length axis Ai of the member 1, precludes rotation of the jig 10 about an axis that lies on the side surface 1A and is parallel to the axis $A_3$, and which, owing to its also thus engaging member 1 depthways, i.e. along an axis (likewise on side face 1A) that is parallel to the axis $A_3$, precludes rotation of the jig 10 about an axis that lies on the side surface 1A and is parallel to the axis $A_1$.

The wall 11 also defines a second locator, comprising the edge 11B, which, owing to its thus engaging the member 2 depthways, i.e. along an axis (on side face 2A) that is parallel to the axis $A_3$, precludes rotation of the jig 10 about an axis that lies on the side surface 2A and is parallel to the length axis $A_2$ of the member 2.

The wall 12 defines another locator, comprising face 12A, which, owing to its thus engaging the member 1 lengthways, i.e. along an axis (on bottom face 1B) that is parallel to the length axis Ai of the member 1, precludes rotation of the jig 10 about an axis that lies on the bottom surface 1B and is perpendicular to the axis $A_1$, and which, owing to its also thus engaging member 1 widthways, i.e. along an axis (likewise on bottom face 1B) that is perpendicular to the axis $A_1$, precludes rotation of the jig 10 about an axis that lies on the bottom surface 1B and is parallel to the axis $A_4$.

Figure 12:
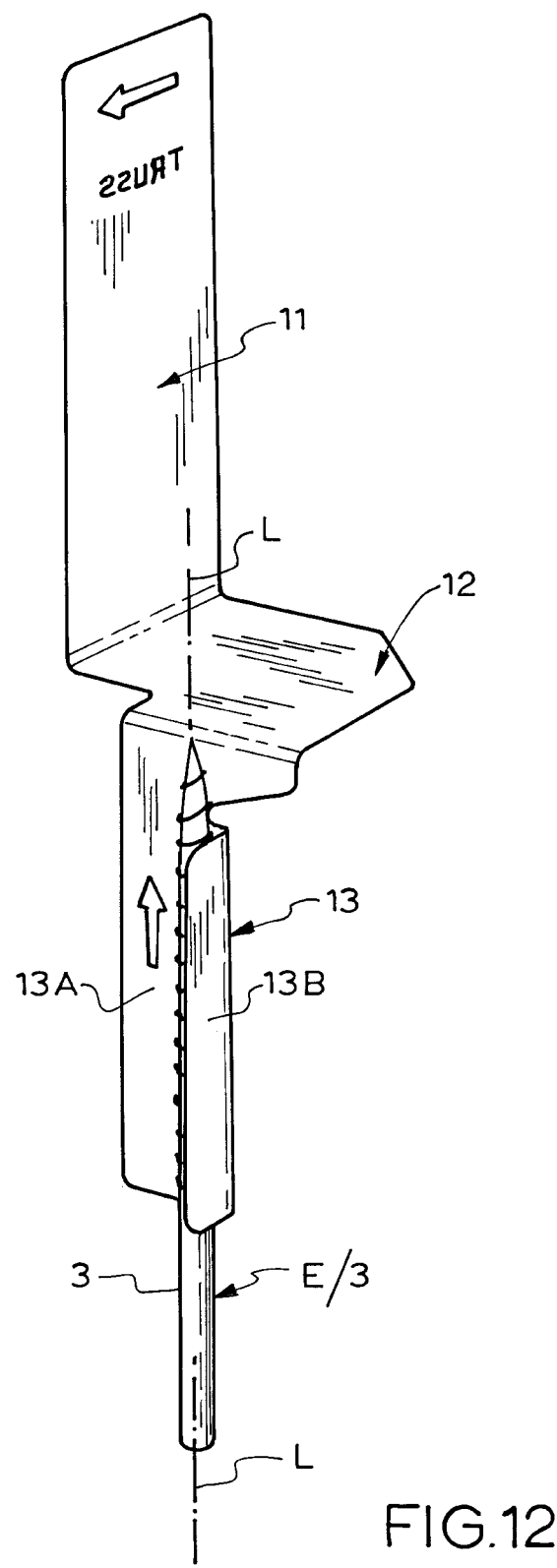
FIG. 12 is a rear/side perspective elevation view showing supporting/guiding of a said fastener by the jig of the first embodiment in the application of the fastener to form the connection.

The guide 13 comprises a first supporting wall 13A, defining a flat support face 13A1, which is perpendicular to each of walls 11, 12/faces 11A, 12A, and a second supporting wall 13B, defining a flat support face 13B1, which is perpendicular to each of walls 12, 13A/faces 12A, 13A1 and is parallel to wall 11/face 11A, the wall 13A projecting from the said lateral side of the wall 12 and the wall 13B projecting from a lateral side of the wall 13A. Referring to FIG. 12, the walls 13A, 13B/faces 13A1, 13B1 are arranged for receipt thereagainst of side portions of the element to be guided by the guide 13, such that (when the jig 10 is correctly located) the central longitudinal axis L of the element E is coaxial with the axis $A_3$, whereby driving of the element, while the abutment between it and each of the faces 13A1 and 13B1 is maintained, directs it along the axis $A_3$, through surface 1B, and into/within the first member 1.

The jig 10 includes a corner C1, at which wall 11 and wall 12 are interconnected, a corner C2, at which the wall 12 and guide 13/wall 13A are interconnected, and a corner C3, at which the wall 13A and wall 13B are interconnected.

Where the element E is the fastener 3 (as is typically preferable), it is driven, preferably uninterruptedly, not only into/within the first member 1 but also through that member and thence into/within (and possibly through) the second member 2 until fully home. The further driving of the element E/3, whereby it passes through the first member 1 and/or extends into/through the second member 2, can be guided by the guide 13 (correctly located)—and possibly also by the hole(s) thus formed by the element E/3—though could instead be guided solely by the hole(s) (possibly with the jig 10 removed).

Where the element E is instead a hole-forming tool, the driving thereof will comprise (i) driving it, while guided by the guide 13 of the correctly located jig 10, into/within the first member 1. The driving thereof may additionally comprise (ii) further driving it, guided by the jig 10 correctly positioned and/or by the hole created by (i), such that it passes through the member 1. Where the driving includes (ii), it may, additionally still, comprise (iii) still further driving it, guided by the jig 10 correctly positioned and/or by the hole created by (i)/(ii), into/within (and possibly through) the second member 2. The subsequent application of the connecting element 3 to the members 1, 2 can then be, advantageously, guided by the hole formed by (i) or (i) and (ii), or by either or each of holes formed by (i), (ii) and (iii).

The jig 10 is configured with markings 11X and 13X respectively, arranged to be visible by the user thereof when in use. In the embodiment described and illustrated, markings 11X are arranged on wall 11, and comprise an arrow 11Y pointing in the direction, from the wall 11, in which the second member 2 is to lie/the jig 10 is to be slid (along member 2) when wall 11/face 11A is received against surface 1A, for the jig 10 to be correctly located, and further comprise a reference 11Z to the structural component comprising the second member which the edge 11B is to abut when the jig 10 is correctly located, namely the word "truss", the second member 2 in the example illustrated being a truss. In the embodiment described and illustrated, markings 13X are arranged on guide 13, more particularly on wall 13A thereof, and comprise an arrow 13Y pointing in the direction, from the wall 13A/guide 13, in which the first member 1 is to lie/the jig 10/edge 11B is to be moved/slid (along member 2/surface 2A) when wall 11/face 11A is received against surface 1A, for the jig 10 to be correctly located, and further comprise a reference 13Z to the structural component comprising the first member which the wall 12/face 12A is to abut when the jig 10 is correctly located, namely the word "top plate", the first member 1 in the example illustrated being a top plate.

Figure 13:
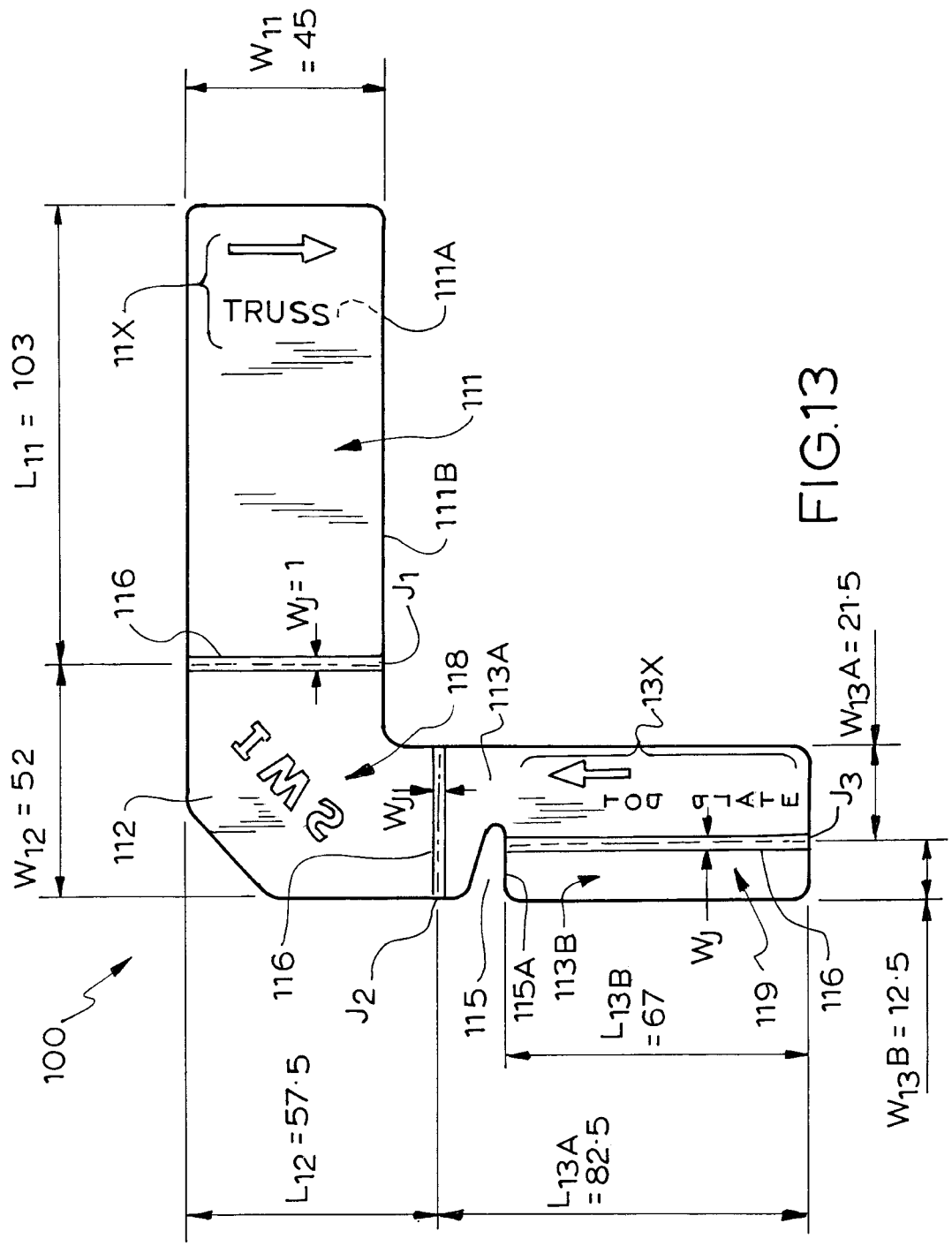
FIG. 13 is a plan view of a blank bendable/foldable to form the jig in accordance with the first embodiment.
Figure 14A:
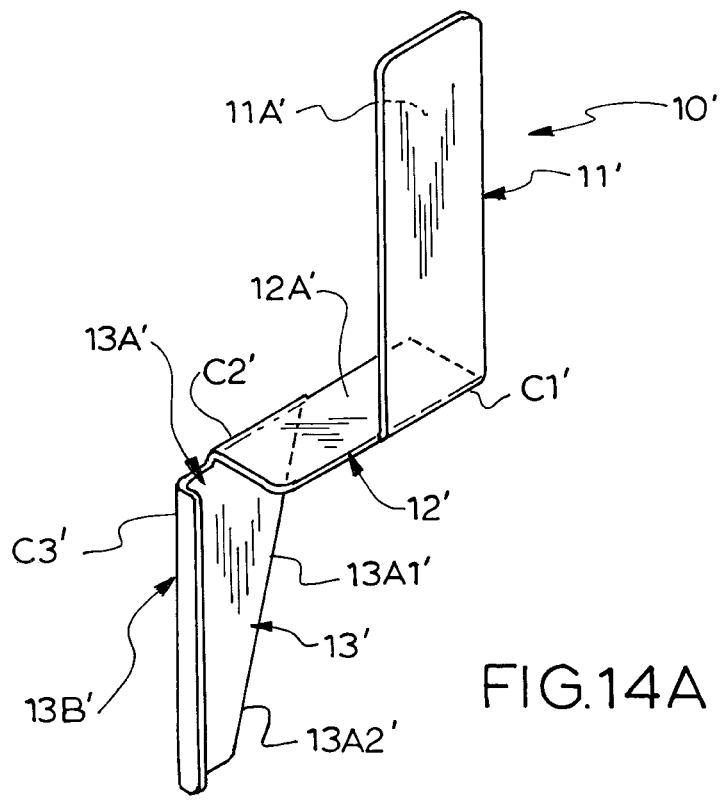
FIG. 14A is a front/side perspective elevation view of a jig according to a second embodiment of the present disclosure, for applying the fastener such that it is correctly positioned/orientated in the connection.
Figure 14B:
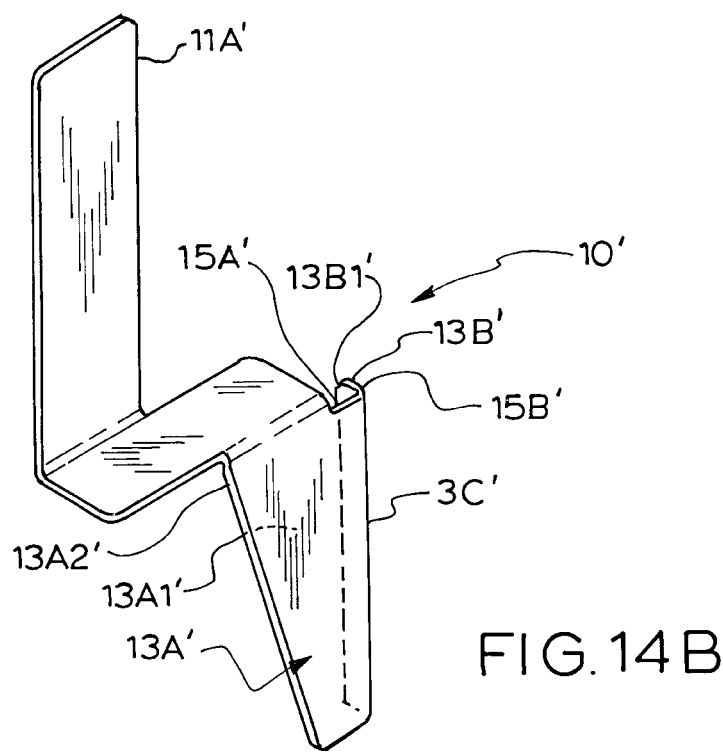
FIG. 14B is a rear/side perspective elevation view of the jig of the second embodiment.
Figure 15A:
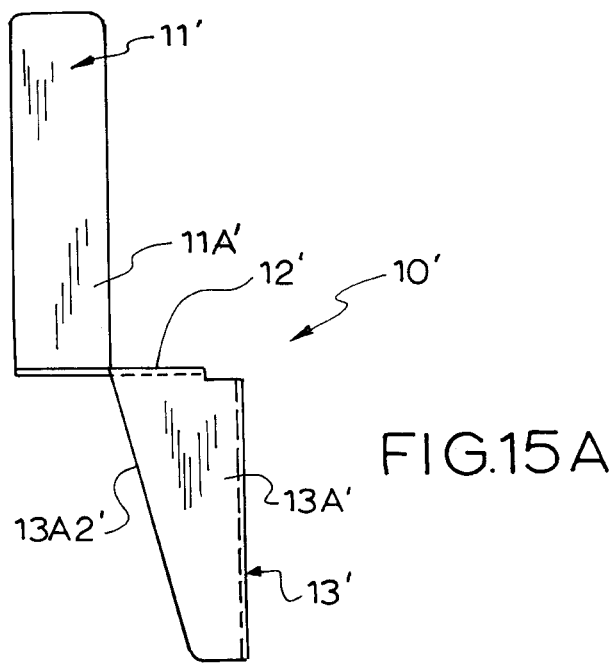
FIG. 15A is a front elevation view of the jig of the second embodiment.
Figure 15B:
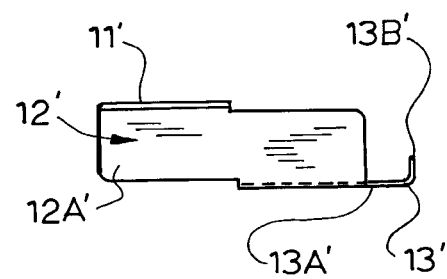
FIG. 15B is a plan view showing "Detail A" labelled in FIG. 15A.
Figure 15C:
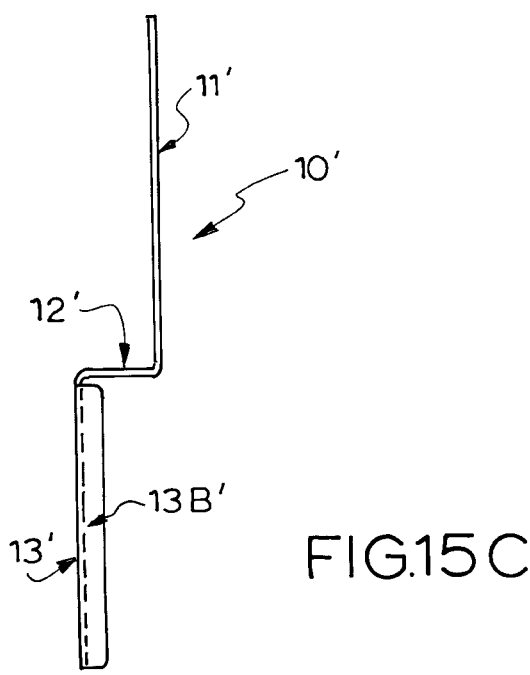
FIG. 15C is a side elevation view of the jig of the second embodiment.

The blank 100, shown in FIG. 13, is cut—e.g. punched, stamped or laser cut—from plate, typically of metal such as aluminium or steel. Plate having a thickness of BMT 1.15 mm, a Z275 coating and a G300 grade is one example suitable for the applications/embodiments described and illustrated herein.

The blank 100, shown in FIG. 13, is bendable/foldable to form the jig 10 and comprises a portion 111 to define wall 11, that portion having a surface 111A to define locating face 11A and an edge 111B to define locating edge 11B, and being configured with the markings 11X. The blank 100 further comprises, integral with portion 111, a section 118 bendable/foldable to define the wall 12 and guide 13, which section comprises a portion 112 to define wall 12, that portion having a surface 112A to define locating face 12A, and a subsection 119, having portions 113A and 113B and being bendable/foldable such that those portions define the walls 13A and 13B respectively.

The blank 100 includes a junction J1, between portion 111 and portion 112/section 118, a junction J2, between portion 112/section 118 and portion 13A/section 119, and a junction J3, between portion 13A and portion 13B, at each of which junctions it is bendable/foldable to form corners C1, C2 and C3 respectively. The junctions J1, J2 and J3 be configured therealong with score lines and/or perforations 116 to facilitate bending/folding.

The blank 100, specifically section 119 thereof, is configured with a void or notch 115, which opens through the opposed main faces and a lateral side of the section 119, defining an edge 115A which is transverse to junction J3 and at which the junction J3 terminates, whereby the section 119 is bendable/foldable at junction J3, such that that edge defines, between the corner C3 thus formed and said lateral side, an upper edge 15 of the wall 13B.

The dimensioning of the blank 100, referring to FIG. 11, is for a said first member 1 having a depth $D_1$ of 35 mm (or instead, for example, 45 mm) and a width $W_1$ of 70 mm, consistent with a standard timber section on-flat, and for a said second member 2 having a depth $D_2$ of 90 mm (or instead, for example, 70 mm) and a width $W_2$ of 35 mm, consistent with another standard timber section on-edge, and for the hole-forming element E/fastener 3 having a maximum diameter $\phi_{max}$ (along its shank) of 8 mm. Referring to FIG. 13, those dimensions are as follows:

length of wall 11, $L_{11}$=103 mm
width of wall 11, $W_{11}$=45 mm
length of wall 12, $L_{12}$=57.5 mm
width of wall 12, $W_{12}$=52 mm
length of wall 13A, $L_{13A}$=82.5 mm
width of wall 13A, $W_{13A}$=12.5 mm
length of wall 13B, $L_{13B}$=67 mm
width of wall 13B, $W_{13B}$=21.5 mm
width of each junction J, $W_J$=1 mm This dimensioning is such that, when the jig 10 is correctly located and the element E/fastener 3 is received against the walls 13A, 13B/faces 13A1, 131B, the longitudinal axis L of the fastener 3 is coaxial with the axis $A_3$.

Figure 16:
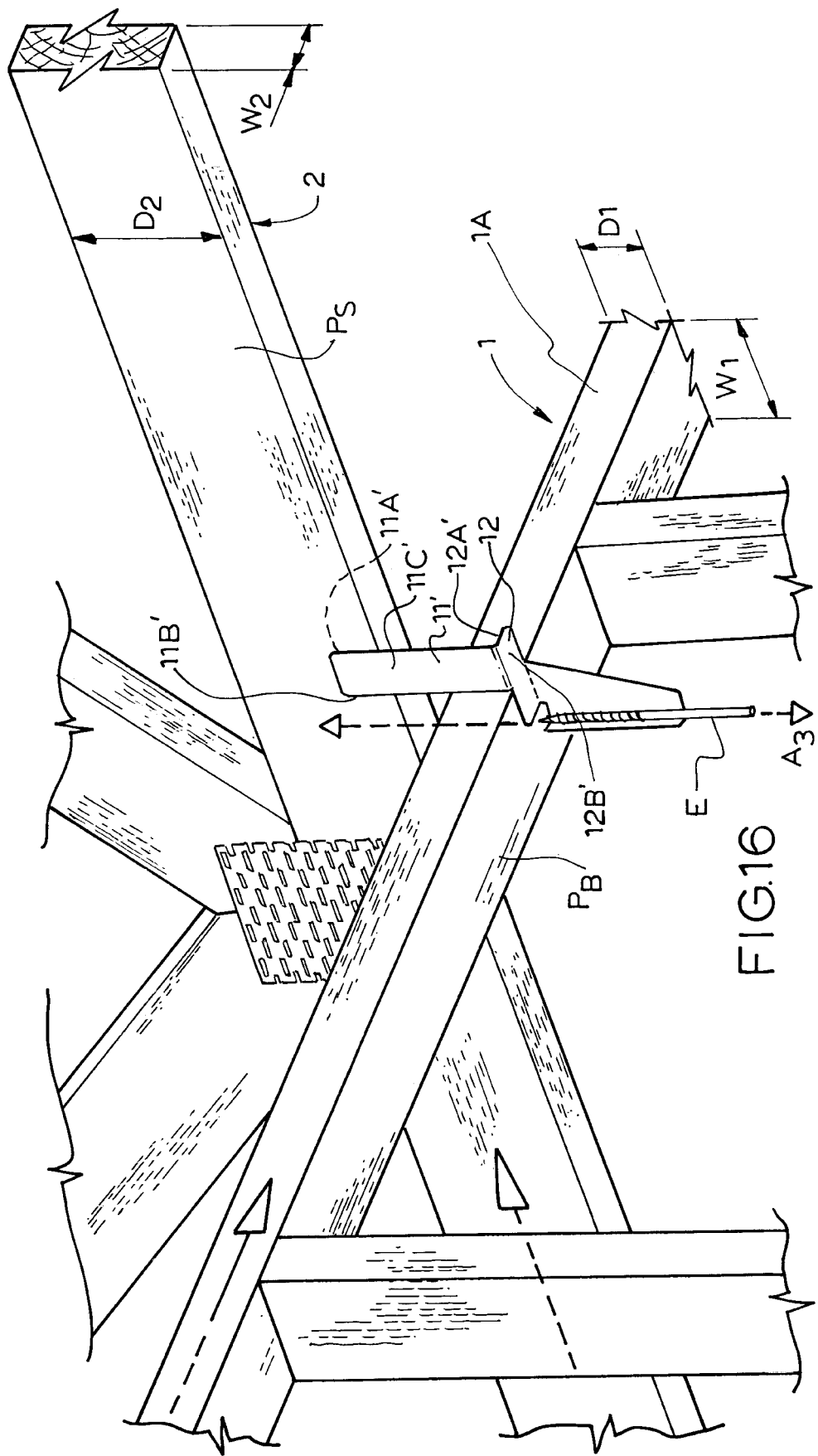
FIG. 16 is a perspective elevation view showing supporting/guiding of a said fastener by the jig of the second embodiment in the application of the fastener to form the connection.

In another alternative embodiment, the truss bottom chord/trimmer and top plate could constitute the first and second members (instead of the second and first members) respectively. In such an embodiment, the jig would be dimensioned such that the locating face and locating edge of its horizontally locating wall are to be received against a side face of the bottom chord/trimmer and a side face of the top plate respectively, the face of the vertically locating wall is to be received against a top face of the bottom chord, and the guide is positioned such that, when the locating face and locating edge of the horizontally locating wall and the locating face of the vertically locating wall are so received, is above the top face of the bottom chord, to guide application of the connector/driving of the hole-forming tool through said top surface/into the trimmer/chord/top plate. In such an embodiment, appropriate dimensions for the jig (for a same-diameter fastener/connector, which connector would need to be longer, in order to be able to extend through the depth $D_2$ of the chord/trimmer, across the gap between the chord/trimmer and the top plate, and into the top plate) would be as follows:

length of wall 11, $L_{11}$=138 mm
width of wall 11, $W_{11}$=45 mm
length of wall 12, $L_{12}$=75 mm
width of wall 12, $W_{12}$=24.5 mm
length of wall 13A, $L_{13A}$=102 mm
width of wall 13A, $W_{13A}$=12.5 mm
length of wall 13B, $L_{13B}$=102 mm
width of wall 13B, $W_{13B}$=21.5 mm
width of each junction J, $W_J$=1 mm Shown in FIGS. 14A to 14C and 15A to 15C is a jig 10' according to a second embodiment of the present disclosure which, referring to FIG. 16, is configured to be positioned relative to the first member 1 and second member 2, for locating the hole-forming element E, whereby the element E/hole extends along the axis $A_3$ in the first member 1, such that the connecting element 3, during application thereof to the members 1, 2, is guided—by the jig 10' (and possibly also the deepening hole it forms), during said driving, in the case of the element E being the connecting element 3, or by the hole, subsequent to said driving, in the case of the element being a pilot/starter hole-forming tool (such as a drill tool/bit) —as it is applied to the members 1, 2, thereby assuming the correct position and orientation therein.

The jig 10' is bent or folded from a blank 100', shown in FIGS. 17A to 17C, configured in the form of a plate. The jig 10' comprises a horizontally locating wall 11', a vertically locating wall 12', perpendicular to wall 11' and from one end of which the wall 11' projects, and a guide 13', projecting perpendicular to the wall 12', from the other end thereof, in a direction opposite to that in which the wall 11' projects. The wall 11' defines on one side thereof a flat locating face 11A' arranged to be (as shown in FIG. 16) received against upright side surface 2A of the member 2, thus orientating the jig 10' (and guide 13') correctly about a rotational axis in the plane $P_S'$ of the side surface 2A and parallel to axis $A_3$, and positioning correctly the jig 10' along an axis parallel to axis Ai/perpendicular to the plane $P_S'$. The wall 12' defines on one side thereof a flat locating face 12A' arranged to be (as also shown in FIG. 16) received against the bottom surface 1B of the member 1, thus orientating the jig 10' (and guide 13') correctly about a rotational axis in the plane PB of surface 1B and parallel to axis $A_2$, and positioning the jig 10', and in particular the guide 13', correctly along an axis parallel to axis A3/perpendicular to the plane PB. Either or each of the walls 11' and 12', when the faces 11A' and 12A' thereof are received against surfaces 2A and 1B respectively, additionally serves to orientate the jig 10' correctly about a respective one of rotational axes, in planes Ps' and PB respectively, parallel to axis A2. The wall 11' has an upright edge 11B' which extends perpendicular to face 12A' and can be, when the faces 11A' and 12A' thereof abut surfaces 2A and 1B respectively, arranged in abutment with upright side surface 1A of member 1—typically by sliding of the jig 10' (towards member 1) along member 2—thereby correctly locating the jig along axis $A_2$, whereupon the jig 10' is located in position ("correctly located"), such that guide 13' is correctly orientated rotationally and correctly positioned translationally to locate the element relative to the members 1, 2.

The wall 11' defines a first locator, comprising the edge 11B', which, owing to its thus engaging the member 1 depthways, i.e. along an axis (on side face 1A) that is parallel to the axis A3, precludes rotation of the jig 10' about an axis that lies on the side surface 1A and is parallel to the length axis Ai of the member 1.

The wall 11' defines a second locator, comprising the face 11A', which, owing to its thus engaging the member 2 lengthways, i.e. along an axis (on side face 2A) that is parallel to the length axis $A_2$ of the member 2, precludes rotation of the jig 10' about an axis that lies on the side surface 2A and is parallel to the axis $A_3$, and which, owing to its also thus engaging member 2 depthways, i.e. along an axis (likewise on side face 2A) that is parallel to the axis $A_3$, precludes rotation of the jig 10' about an axis that lies on the side surface 2A and is parallel to the axis $A_2$.

The wall 12' defines another locator, comprising face 12A', which, owing to its thus engaging the member 1 lengthways, i.e. along an axis (on bottom face 1B) that is parallel to the length axis Ai of the member 1, precludes rotation of the jig 10' about an axis that lies on the bottom surface 16 and is perpendicular to the axis Ai, and which, owing to its also thus engaging member 1 widthways, i.e. along an axis (likewise on bottom face 1B) that is perpendicular to the axis $A_1$, precludes rotation of the jig 10' about an axis that lies on the bottom surface 16 and is parallel to the axis At The guide 13' comprises a first supporting wall 13A', defining a flat support face 13A1', which is parallel to wall 11'/face 11A' and perpendicular walls 12'/face 12A', and a second supporting wall 13B', defining a flat support face 13B1', which is perpendicular to each of walls 11', 12', 13A'/faces 11A', 12A', 13A1', the wall 13A' projecting from the said other end of the wall 12' and the wall 13B' projecting from a lateral side of the wall 13A'. The walls 13A', 13B'/faces 13A1', 13B1' are arranged for receipt thereagainst of side portions of the element to be guided by the guide 13', such that (when the jig 10' is correctly located) the central longitudinal axis L of the element E is coaxial with the axis A3, whereby driving of the element, while the abutment between it and each of the faces 13A1' and 13B1' is maintained, directs it along the axis $A_3$, through surface 1B, and into/within the first member 1. The wall 13A' is configured with a tapered edge 13A2'.

The jig 10' includes a corner C1, at which wall 11' and wall 12' are interconnected, a corner C2', at which the wall 12' and guide 13'/wall 13A' are interconnected, and a corner C3', at which the wall 13A' and wall 13B' are interconnected.

Where the element E is the fastener 3 (as is typically preferable), it is driven, preferably uninterruptedly, not only into/within the first member 1 but also through that member and thence into/within (and possibly through) the second member 2 until fully home. The further driving of the element E/3, whereby it passes through the first member 1 and/or extends into/through the second member 2, can be guided by the guide 13' (correctly located)—and possibly also by the hole(s) thus formed by the element E/3—though could instead be guided solely by the hole(s) (possibly with the jig 10' removed).

Where the element E is the fastener 3 (as is typically preferable), it is driven, preferably uninterruptedly, not only into/within the first member 1 but also through that member and thence into/within (and possibly through) the second member 2 until fully home. The further driving of the element E/3, whereby it passes through the first member 1 and/or extends into/through the second member 2, can be guided by the guide 13' (correctly located)—and possibly also by the hole(s) thus formed by the element E/3—though could instead be guided solely by the hole(s) (once/where deep enough to guide the element E/3).

Where the element E is instead a hole-forming tool, the driving thereof will comprise (i) driving it, while guided by the guide 13' of the correctly located jig 10', into/within the first member 1. The driving thereof may additionally comprise (ii) further driving it, guided by the jig 10' correctly positioned and/or by the hole created by (i), such that it passes through the member 1. Where the driving includes (ii), it may, additionally still, comprise (iii) still further driving it, guided by the jig 10' correctly positioned and/or by the hole created by (i)/(ii), into/within (and possibly through) the second member 2. The subsequent application of the connecting element 3 to the members 1, 2 can then be, advantageously, guided by the hole formed by (i) or (i) and (ii), or by either or each of holes formed by (i), (ii) and (iii).

The jig 10' may be configured with markings 11X and 13X as shown in the illustrations of the jig 10.

The blank 100', shown in FIGS. 17A to 17C, is bendable/foldable to form the jig 10' and comprises a portion 111' to define wall 11', that portion having a surface 111A' to define locating face 11A' and an edge 111B' to define locating edge 11B' (and being possibly configured with the markings 11X). The blank 100' further comprises, integral with portion 111', a section 118' bendable/foldable to define the wall 12' and guide 13', which section comprises a portion 112' to define wall 12', that portion having a surface 112A' to define locating face 12A', and a subsection 119', having portions 113A' and 113B' and being bendable/foldable such that those portions define the walls 13A' and 13B' respectively.

The blank 100' includes a junction J1', between portion 111' and portion 112'/section 118', a junction J2', between portion 112'/section 118' and portion 13A'/section 119', and a junction J3', between portion 13A' and portion 1313', at each of which junctions it is bendable/foldable to form corners CI, C2' and C3' respectively. The junctions J1', J2' and J3' be configured therealong with score lines and/or perforations 116' to facilitate bending/folding.

The blank 100', specifically section 119' thereof, is configured with a void or cutout 115' defining an edge 115A' which is transverse to junction J3' and at which the junction J3' terminates, whereby the section 119' is bendable/foldable at junction J3', such that that edge defines both an upper edge 15A' of the wall 13A' and an upper edge 15B' the wall 13B'.

The dimensioning of the blank 100' is for a said first member 1 having a depth $D_1$ of 35 mm (or instead, for example, 45 mm) and a width $W_1$ of 70 mm, consistent with a standard timber section on-flat, and for a said second member 2 having a depth $D_2$ of 90 mm (or instead, for example, 70 mm) and a width $W_2$ of 35 mm, consistent with another standard timber section on-edge, and for the hole-forming element E/fastener 3 having a maximum diameter $\phi_{max}$ (along its shank) of 8 mm. Referring to FIGS. 17A to 17C, those dimensions are as follows:

length of wall 11', $L_{11}'$=134.8 mm
width of wall 11', $W_{11}'$=30 mm
length of wall 12', $L_{12}'$=40 mm
width of wall 12', $W_{12}'$=32.5 mm
length of wall 13A', $L_{13A}'$=98.5 mm
width of wall 13A', $W_{13A}'$=10 MM
length of wall 13B', $L_{13B}'$=114 mm
width of wall 13B', $W_{13B}'$=7 mm
width of each junction J', $W_J$=1 mm This dimensioning is such that, when the jig 10' is correctly located and the element E/fastener 3 is received against the walls 13A, 13B/faces 13A1, 13B1, the longitudinal axis L of the fastener 3 is coaxial with the axis $A_3$.

Figure 18A:
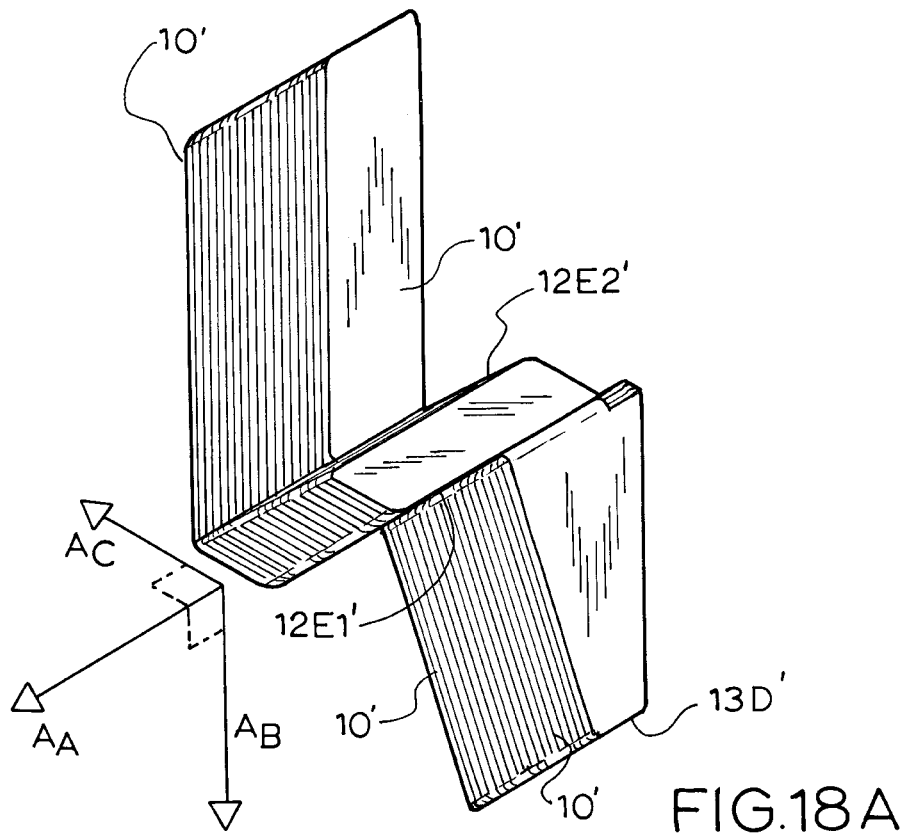
FIG. 18A is a perspective view showing nested jigs of the second embodiment.

Advantageously, referring to FIG. 18A, because jigs 10' are nestable one-after-another, along/parallel to orthogonal axes $A_A$, $A_B$ and $A_C$, the axis $A_A$ extending in a direction from face 13B1', perpendicular to wall 13B'/face 13B1', the axis AB (referring also to FIG. 16) extending in a direction from the face 12B' of wall 12' which is opposite to the locating face 12A' of that wall, perpendicular to the wall 12'/face 12B', and the axis Ac (also referring to FIG. 16) extending in a direction from the face 12C' of wall 11' which is opposite to the locating face 11A' of that wall, perpendicular to the wall 11'/face 12C'. The jig 10' is thus configured such that it and like jigs 10' can be compactly arranged (in nested relation) for storage and freighting.

Figure 18B:
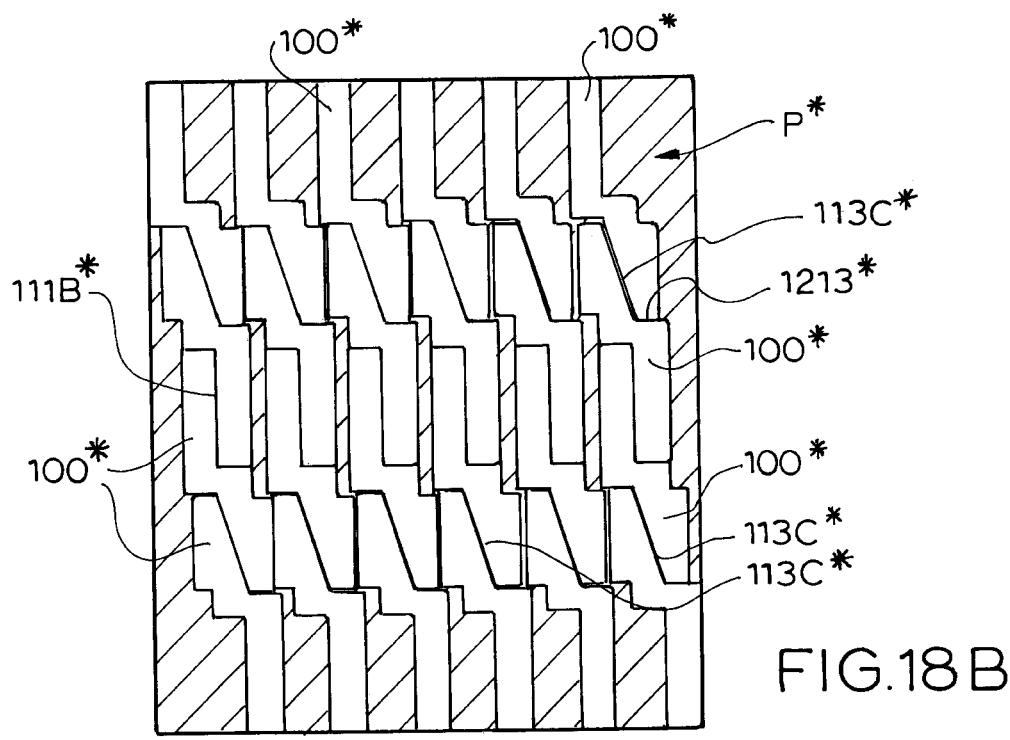
FIG. 18B is a perspective view showing a pattern of shapes on a plate from which jigs of the second embodiment, each corresponding to a respective one of the shapes, are to be cut.

Also advantageously, referring to FIG. 18B, owing especially to the tapered edge 113C' of the blank 100', which defines the tapered edge 13C' of the jig 10', and the diametrically opposite free or "junctionless" edge sections 12E1' and 12E2' at the opposite ends of the wall 12' (defined by corresponding edge sections 112E1' and 112E2', respectively, of the portion 112' of the blank 100', shown in FIG. 17A), in a given plate P* (e.g. BMT 1.15 mm, a Z275 coating and a G300 grade) from which blanks 100' are to be cut, shapes 100* each corresponding to respective one of the blanks 100' can be arranged in rows, each of the shapes 100* in a given row assuming, about a respective axis perpendicular to the plate P*, an orientation that same as that assumed by the other shapes 100* in that row, and opposite to that of the shapes 100* in the/each row adjacent to it, whereby (in a single stamping/punching operation or laser cutting procedure) single cuts made along respective ones of lines 113C* define tapered edges 113C of two blanks 100', single cuts made along respective ones of lines 1213* define edge 112E1' of one blank 100' and edge 113D' (the latter being shown in FIG. 17A and defining a lower edge 13D' of the guide 13') of another blank 100', and single cuts made along respective ones of lines 111B* define edges 111B of two blanks 100' respective pairs of tapered edges 113C, the tessellating of shapes 100* being such that most of the material of the plate P* is utilised to form the blanks 100'.

In another alternative embodiment, the truss bottom chord/trimmer and top plate could constitute the first and second members (instead of the second and first members) respectively. In such an embodiment, the jig would be dimensioned such that the locating face and locating edge of its horizontally locating wall are to be received against a side face of the bottom chord/trimmer and a side face of the top plate respectively, the face of the vertically locating wall is to be received against a top face of the bottom chord, and the guide is positioned such that, when the locating face and locating edge of the horizontally locating wall and the locating face of the vertically locating wall are so received, is above the top face of the bottom chord, to guide application of the connector/driving of the hole-forming tool through said top surface/into the trimmer/chord/top plate. In such an embodiment, appropriate dimensions for the jig (for a same-diameter fastener/connector, which connector would need to be longer, in order to be able to extend through the depth $D_2$ of the chord/trimmer, across the gap between the chord/trimmer and the top plate, and into the top plate) would be as follows:

length of wall 11', $L_{11}'$=99.8 mm
width of wall 11', $W_{11}'$=30 mm
length of wall 12', $L_{12}'$=22.5 mm
width of wall 12', $W_{12}'$=60 mm
length of wall 13A', $L_{13A}'$=79 mm
width of wall 13A', $W_{13A}'$=10 MM
length of wall 13B', $L_{13B}'$=79 mm
width of wall 13B', $W_{13B}'$=7 mm
width of each junction J', $W_J'$=1 mm
width of each junction J, $W_J$=1 mm The jig 10 or 10', though used for installation of a connector/fastener which provides a translationally floating connection between said first and second members in the example described and illustrated herein, is not limited to such installation. It could, for example, instead be used to install a connector/fastener which provides a connection that does not translationally float and/or applied to mutually transverse first and second structural members either or each of which is of another kind. In one alternative embodiment, the second member could be, for example, a trimmer (instead of a truss bottom chord) extending orthogonal to the first member.

Furthermore, where the jig 10 or 10' is used for installation of a connector which does provide a translationally floating connection between said first and second members, the type of connector/floating connection formed may vary—for example the connector may be configured such that it is fixed to the first member and is translationally slidably/movably received in the second member (oppositely to that in the embodiments described and illustrated), or is translationally slidably/movably received in both members. Alternatively, the connector may be configured such that respective portions thereof are both fixed (at least axially) to the members in which they are received though can move one-relative-to-the-other along the axis $A_3$—for example, it may have an extendable/retractable telescopic structure comprising the portions. That said, the connector described and illustrated provides for a particularly simple while highly reliable interconnection and installation.

Moreover, the axis $A_3$ need not in all embodiments/applications be vertical/upright. It could instead, for example, be horizontal or assume an oblique orientation.

Although (as indicated previously), the truss bottom chord/trimmer and top plate could constitute the first and second members (instead of the second and first members) respectively, the jig 10 or 10' and its being located for application of the fastener/connector from beneath, through the top plate will, in many applications, provide for the installer optimal access to the job, allowing the installer to be positioned, typically standing, beneath the top plate/truss to apply the fastener/connector—and also for an inspector to be able to inspect readily the adequacy of the connection by sighting, from below, the end of fastener/connector at the underside of the top plate.

Also, as will be clear from the foregoing, the jig 10 or 10' can be put to advantageous use for forming, in the former or each of the first and second members, a hole—correctly positioned and centred on the axis $A_3$—for receipt, subsequently, of the connector/fastener (the hole(s) serving to guide the connector/fastener, during application thereof, whereby it is correctly orientated and positioned in the connection.

In another embodiment of the present disclosure, the section 119/119' could, instead of being configured with junction J3/J3', have no such junction and be bent about an axis parallel to that junction, such that the guide defined thereby has a single curved face conforming to the curved exterior of the maximum diameter portion(s) of the fastener, or could be omitted altogether and replaced with a separately formed guide, e.g. a bush, appropriately supported from the rest of the jig. That said, the section 119/119' and the configuration thereof described and illustrated, advantageously, provides a simple structure for ensuring reliable centring and guiding of the connector/fastener—and for a simple means of forming the structure (namely folding/bending at the junctions J2/J2' and J3/J3' to form 90° bends or folds, and thus the corners C2/C2' and C3/C3').

Figure 22A:
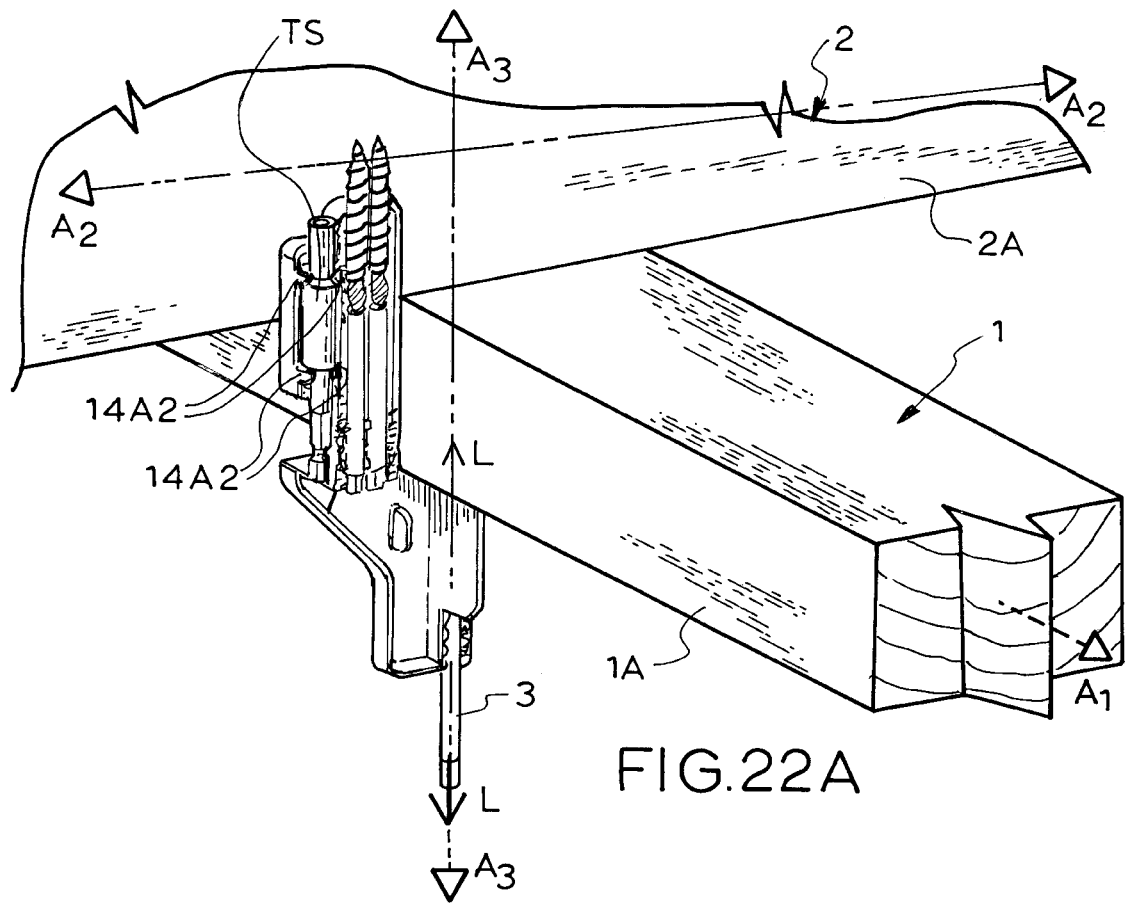
FIGS. 22A and 22B are upper and lower front perspective views showing positioning of the jig of the third embodiment relative to a top plate and truss bottom chord for application of the connecting element/fastener therewith.
Figure 22B:
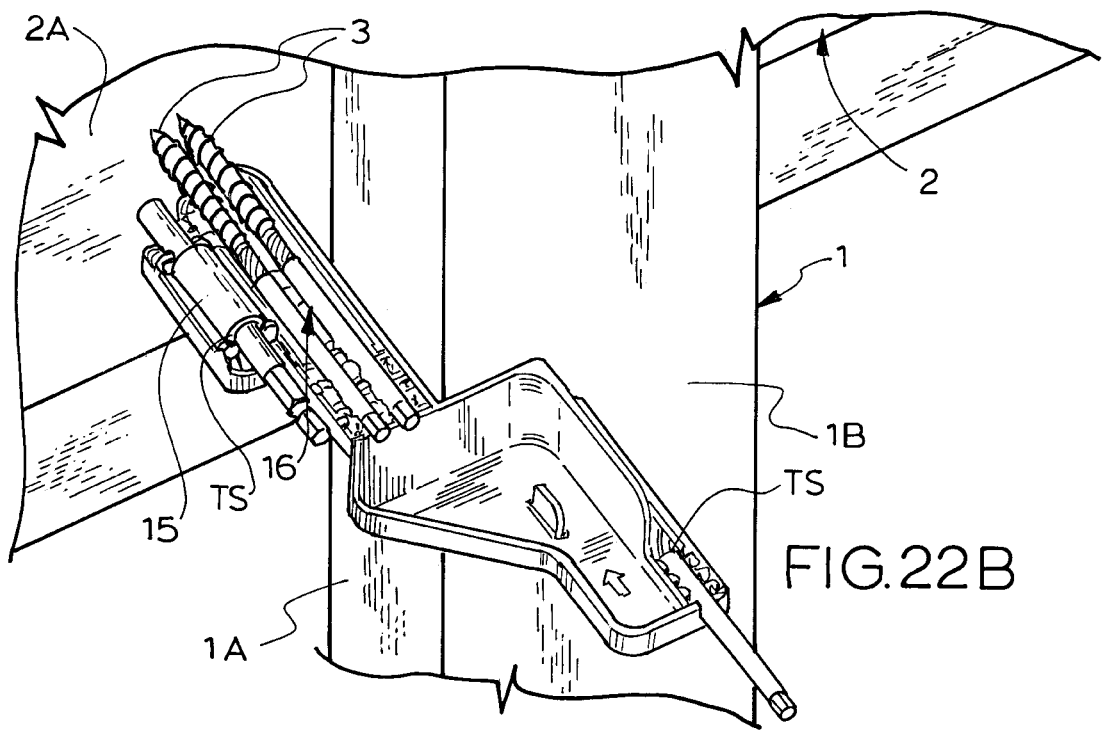

Shown in FIGS. 20A to 20E, 21A and 21B is a jig 10" according to a third embodiment of the present disclosure which, referring to FIGS. 22A and 22B, is configured to be positioned relative to the first member 1 and second member 2, for locating the hole-forming element E—being the connecting element 3—whereby the element extends along the axis $A_3$ in the first member 1 and is guided by the jig 10" (and possibly also by the deepening hole it forms during driving thereof), thereby assuming the correct position and orientation therein.

The jig 10", though being of single-piece or unitary construction (like jigs 10 and 10'), is moulded from plastic.

The jig 10" comprises a horizontally locating wall 11", a vertically locating wall 12", transverse to the wall 11", and a guide 13", projecting transverse to the wall 12", in a direction opposite to that in which the wall 11" projects. The wall 11" defines on one side thereof a flat locating face 11A" arranged to be (as also shown in FIGS. 22A and 22B) received against upright side surface 2A of the member 2, thus orientating the jig 10" (and guide 13") correctly about a rotational axis in the plane Ps' of the side surface 2A and parallel to axis A3, and positioning correctly the jig 10" along an axis parallel to axis Ai/perpendicular to the plane Ps'. The wall 12" defines on one side thereof a flat locating face 12A", which is perpendicular to face 11A", arranged to be (as best seen in FIG. 22B) received against the bottom surface 1B of the member 1, thus orientating the jig 10" (and guide 13") correctly about a rotational axis in the plane PB of surface 1B and parallel to axis A2, and positioning the jig 10", and in particular the guide 13", correctly along an axis parallel to axis $A_3$/perpendicular to the plane $P_B$. Either or each of the walls 11" and 12", when the faces 11A" and 12A" thereof are received against surfaces 2A and 1B respectively, additionally serves to orientate the jig 10" correctly about a respective one of rotational axes, in planes Ps' and PB respectively, parallel to axis $A_2$. The wall 11" has an upright edge 11B" which extends perpendicular to face 12A" and can be, when the faces 11A" and 12A" thereof abut surfaces 2A and 1B respectively, arranged in abutment with upright side surface 1A of member 1 — typically by sliding of the jig 10" (towards member 1) along member 2—thereby correctly locating the jig along axis A2, whereupon the jig 10" is correctly located, such that guide 13" is correctly orientated rotationally and correctly positioned translationally to locate the element 3 relative to the members 1, 2.

The wall 11" defines the first locator, comprising the edge 11 B", and the second locator, comprising the face 11A". The wall 12" defines the "other" locator, comprising face 12A".

The jig 10" or guide 13" comprises, referring to FIG. 21A, a first supporting wall 13A", defining a flat support face 13A1" of the guide 13, which face is parallel to wall face 11A" and perpendicular to face 12A", and spaced parallel second and third supporting walls 13B" and 130", respectively defining flat support faces 13B1" and 13C1" of the guide 13, each of which projects from (a respective one of opposed lateral sides of) the wall 13A" and is perpendicular to faces 11A", 12A" and 13A1".

The walls 13A", 13B", 13C"/faces 13A1", 13B1", 13C1" are arranged for receipt thereagainst of side portions of the element to be guided by the guide 13", such that (when the jig 10" is correctly located) the central longitudinal axis L of the element E is coaxial with the axis $A_3$, whereby driving of the element, while the abutment between it and each of the faces 13A1", 13B1" and 13C1" is maintained, directs it along the axis $A_3$, through surface 1B, and into/within the first member 1.

The jig 10" includes holders, designated generally by the reference numeral 14 (see FIG. 20A), which releasably hold both a driver tool 15, for driving an element 3, and plural elements 3, which holders will be described in further detail shortly.

Referring to FIG. 15E, the tool 15 comprises a fitting 15A (socket) at a leading end thereof, engageable with the fitting 49 formed at the trailing end of the element 3, and a fitting 15B, at a trailing thereof, via which it can be coupled to a (preferably powered) driving device, such as a hand drill, to effect powered driving of the element 3 via the tool 15. Of course instead, without departure from the present disclosure, the leading end fitting of the tool can comprise the male portion and the trailing end of the element the (complementary) female portion (/socket), as indicated previously.

The holders 14, referring to FIG. 21A, comprise clips, which comprise pairs of opposed projections 14A, in the form of ribs or lugs, arranged for receipt therebetween of a shaft or axially extending portion of the tool 15 or element 3 (that portion being shank 42 in the case of the latter). Referring especially to FIGS. 20E and 20F, the spacing between distal end portions 14A1 of the projections 14A in each pair is slightly less than the width/diameter of the respective axially extending portion, whereby urging of that portion against the distal end portions pair causes resilient deformation of either or each projection 14A and/or the portion(s) of the jig from which it projects, such that the spacing between the distal end portions increases and the axially extending portion is thus received between the formations/projections 14A, whereupon the deformed projection(s) 14A/portion(s) of the jig resile/s and the axially extending portion—specifically, a diametric portion thereof/the portion thereof of greatest width—is thus trapped behind projection distal end portions. In this way, the element 3/tool 15 (/the/each axially extending portion thereof) is thus press-fitted or snap-fitted to the respective holder 14/projections 14A or vice versa.

Laterally inner edge portions of the projections 14A in each pair are preferably profiled to conform to, and be received against, the axially extending portion (i.e. curved in the example illustrated, owing to the axially extending portion they engage being circular in cross section).

Figure 20A:
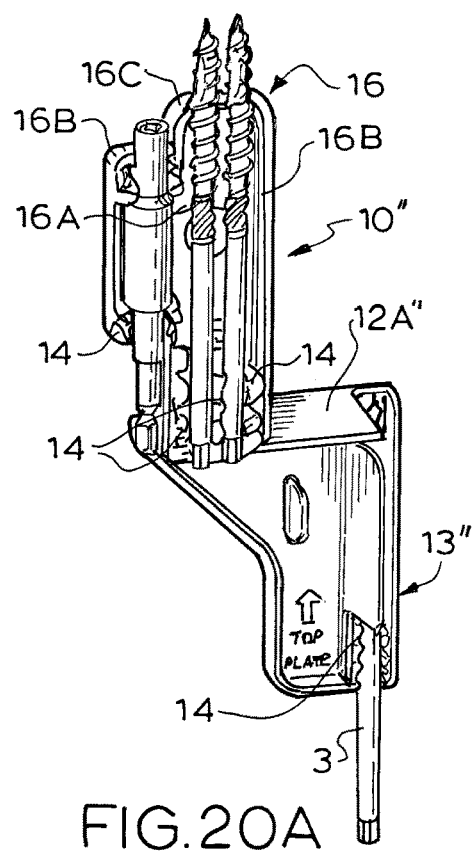
Figure 20B:
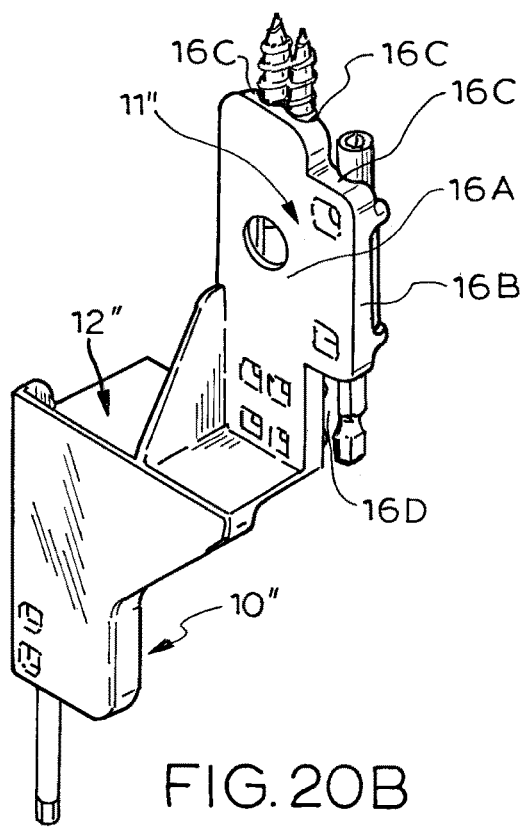
Figure 20C:
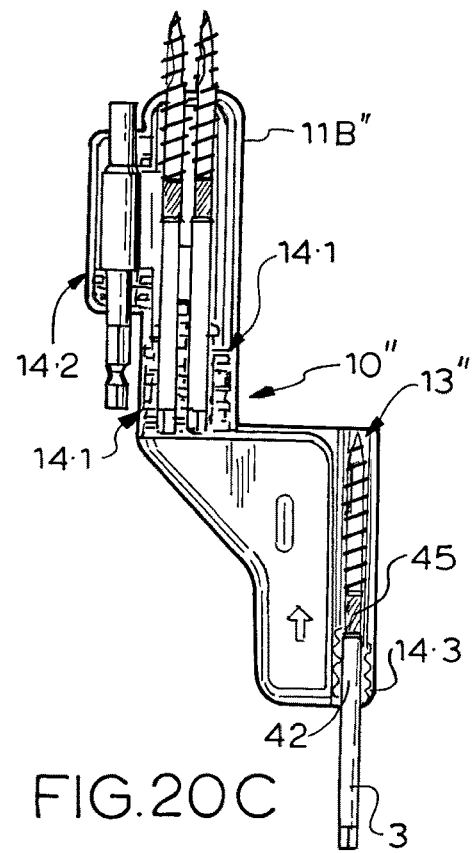
Figure 20D:
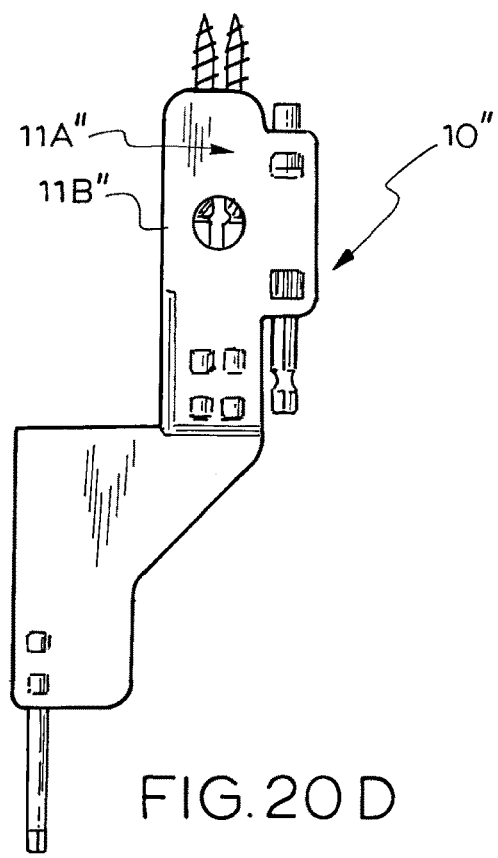

The jig 10" includes, referring to FIGS. 20A and 20B, a storage section 16 having a main or base wall 16A, defining or defined by the wall 11", and side or peripheral wall/walling 16B, projecting from the periphery of the wall 16A, in a direction opposite to that in which the face 11A" faces, stiffening the wall 11" and defining the edge 11B'. Referring to FIG. 20B, the storage section 16 includes ones of the holders 14 — specifically, storage holders 14.1 and 14.2, which hold, in side-by-side relation, one or more elements 3—two, in the example shown—and tool 15, respectively, such that each is received against or closely adjacent the wall 16A. Associated with holders 14.1 and 14.2 are respective cutouts or voids 16C in the wall/walling 16B, into which end portions of the tool 15 and elements 3, respectively, are (partially) received whereby those end portions project beyond the respective end portions of the wall/walling 16B in which the cutouts 16C that receive them are formed. Referring to FIG. 20E, the formations/projections 14A of the holders 14.1 comprise laterally outer ones 14AL, each of which extends from both the wall 16A and a respective one of laterally opposed side portions of wall(ing) 16B, and, between the laterally outer formations/projections 14AL of the/each pair thereof, a (respective) central formation/projection 14AC, which extends from wall 16A and is one of the two projections 14A in each of two said pairs of projections, being configured with two said distal end portions (which are laterally opposed)—one for each pair. A cutout or void 16D, partially bounded by wall(ing) 16B, is arranged so as to be overlain by the trailing end of the took 15 when received by the tool holder formations/projections 14A, the void 16D facilitating access to that trailing end for manual removal of the tool 15 from the jig 10".

As can be seen especially at FIGS. 20A and 22B, the storage section 16 partially houses the tool 15 and elements 3 stored thereby/therein. As can best be seen at FIG. 22A, the jig is configured such that the storage section 16 is open (and accessible) behind the wall 11", opening in a direction opposite to that in which face 11A" faces, to facilitate/permit removal of the tool 15 and element(s) 3 stored thereby, including when the jig 10" is in position.

The jig 10" is preloadable with a said element 3 whereby the element 3 is located to the guide 13, particularly such that the central axis L of the element 3 is coaxial with the guide axis and thus positioned for driving thereof. To this end, the holders 14 include a preloading holder 14.3 the opposed formations/projections 14A of which extend from the walls 13A" and 130", and may also extend from wall 13B", and engage the unthreaded portion/shank 42 of the (preloaded element 3) when the latter is received therebetween, though not to such a degree that the friction between the portion/shank 42 and the projections 14A hinders sliding of the former/element 3 along the projections 14A/laterally opposed edges thereof when the element 3, supported by the guide 13", is driven. The holder 14.3 can be considered to be additional to the guide 13", and positioned at an end thereof which is rearward with respect of the direction of driving of the element 3, or to define the rearward end thereof.

The said pairs comprise ones in which the projections 14A together define a grip or clamp (which is, owing to the projections' being integrally formed with the portions of the jig 10" from which they extend, and to the opening action thereof being attributable to elastic deformation, is a "living" clamp or grip) and/or (referring to FIGS. 22A and 22B) define shoulders or stops 14A2 arranged to abut at least one transverse surface portion of a part of the tool 15 or element 3 (such as a trailing end of the portion 45 in the case of the latter, particularly (forwardmost) formations/projections 14A in the holder 14.3).

The jig 10", referring to FIG. 21A, is configured with markings 11X" and 13X" respectively, arranged to be visible by the user thereof when in use. Markings 11X" are arranged on wall 11"/16" (on the opposite side thereof to the face 11A"), and comprise an arrow 11Y" pointing in the direction, from the wall 11", in which the first member 1 is to lie/the jig 10" is to be slid (along member 2) when wall 11"/face 11A" is received against surface 2A, for the jig 10" to be correctly located, and further comprise a reference 11Z" to the structural component comprising the member (second member 2) along which the jig 10"/wall 11" is slid, namely the word "truss" (the second member 2 in the example illustrated being the bottom chord of a truss). Markings 13X" are arranged on a wall 17A of the jig 10" which defines wall 13A" and from which the walls 12", 13B" and 130" project, the markings 13X" comprising an arrow 13Y" pointing in the direction, in which the first member 1 is to lie/the jig 10"/wall 12" is to be moved for the jig 10" to be correctly located (i.e. with the wall 12"/face 12A" received against first member bottom face 1B), and further comprise a reference 13Z" to the structural component comprising the first member 1 which the wall 12"/face 12A" is to abut when the jig 10" is correctly located, namely the words "top plate", the first member 1 in the example illustrated being a top plate.

Also formed on the wall 11"/16" (on the opposite side thereof to the face 11A") are a marking 11U", comprising the words "extra screws", to refer to the elements 3 held in the storage section 16, and a marking 11V", comprising the word "driver", to refer to the tool 15 held in the storage section, the markings 11 U" and 11V" being positioned so as to be adjacent the elements 3 and tool 15, respectively, when so held.

Figure 23A:
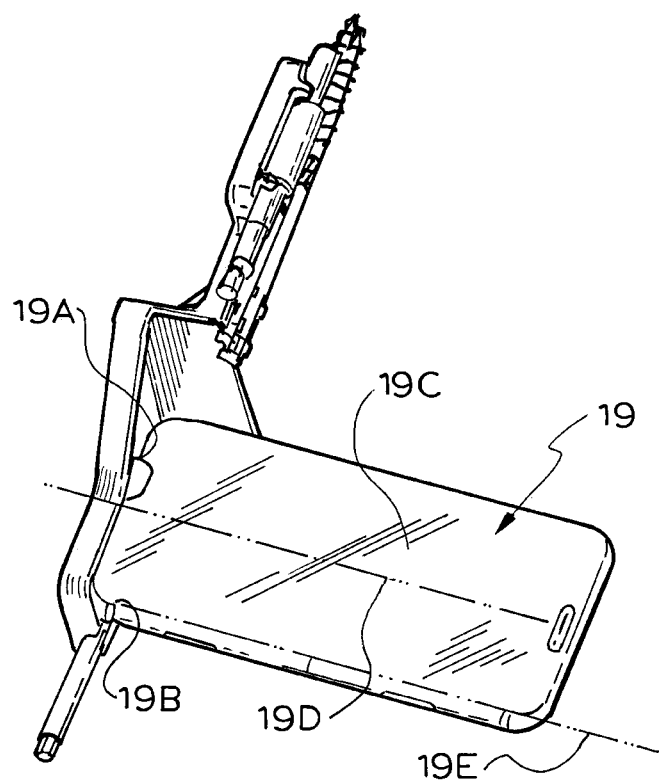
FIGS. 23A to 23C are, respectively, first side, second side and plan views of the jig of the third embodiment and a phone/handheld device held thereby.
Figure 23B:
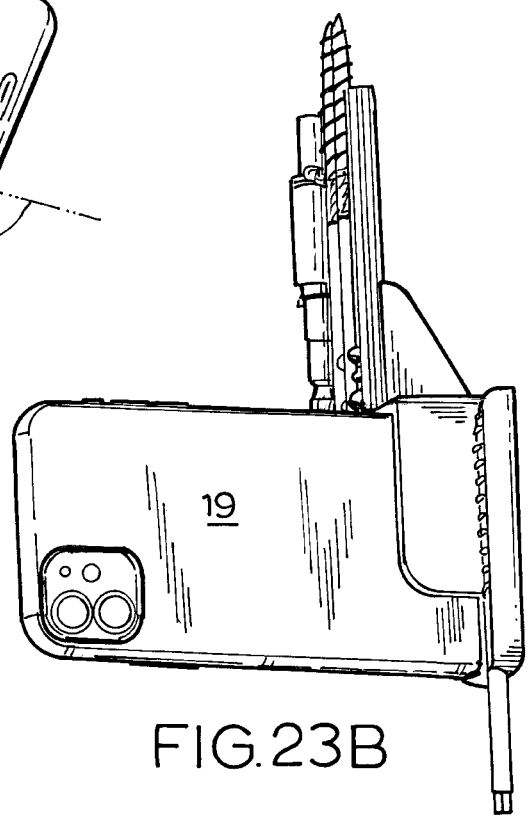
Figure 23C:
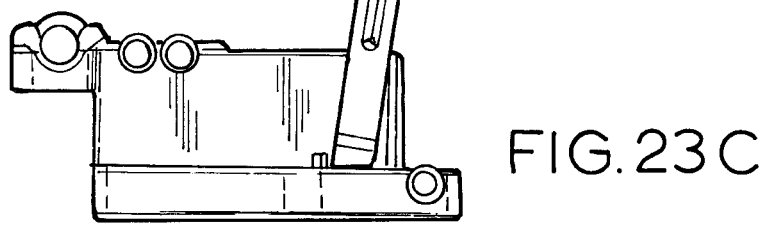

The jig 10" includes side or peripheral wall/walling 17B, projecting from a periphery of the wall 17A, in the same direction as the wall(ing) 16B, stiffening the wall 17A and defining the edge 11B'. The jig 10" further includes opposed tab or wall portions 18A and 18B, which project from wall 17A and are, as shown at FIGS. 23A to 23C, positioned to clamp therebetween a lower edge 19A of a phone 19, possibly in a manner such that a side edge 19B of the phone 19 is supported by an end portion of wall(ing) 17B, and the phone is thus supported in cantilever fashion by the jig 10" whereby the screen 19C thereof faces, in a direction away from, and perpendicular to the axis of, the guide 13. The phone 19 so supported, arranged such that the centreline 19D of the screen or side edge line 19E of the screen/phone is parallel to the plane of the face 12A", may be used, by operation of a level gauge program/app (such as a virtual spirit level app) thereon, when the jig 10" is in position, i.e. the face 11A" abuts second member side face 2A or the face 12A" abuts first member lower face 1B, to determine and indicate whether—and if so to what extent —side face 2A is not vertical or the lower face 1B is not horizontal, respectively.

The present disclosure is not limited to interconnection of timber members; either or each of the two members between which a connection embodying the present disclosure is formed may be formed of other material—e.g. metal, such as steel.

While various embodiments of the present disclosure have been described above, it should be understood that they have been presented by way of example only, and not by way of limitation. It will be apparent to a person skilled in the relevant art that various changes in form and detail can be made therein without departing from the spirit and scope of the present disclosure. Thus, the present disclosure should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A jig positionable relative to first and second members that respectively extend along transverse first and second axes and are spaced along a third axis that is transverse to the first and second axes, and for locating a hole-forming element with respect to the first and second members and guiding the hole-forming element along the third axis during driving of the hole-forming element into the first member such that a hole formed by the hole-forming element in the first member extends along the third axis, the jig comprising:
   a base wall extending horizontally and having a first edge and a second edge;
   a locating wall extending vertically and connected to the first edge of the base wall;
   wherein the locating wall defines first and second locators respectively positionable against the first and second members; and
   a guide extending vertically and connected to the second edge of the base wall, wherein the guide is configured to engage the hole-forming element such that the hole-forming element extends along a guide axis coaxial with the third axis such that driving of the hole-forming element forms the hole along the third axis.

2. The jig of claim 1, wherein the first locator is positionable against a first surface of the first member that extends parallel to the first axis and the second locator is positionable against a second surface of the second member that extends parallel to the second axis.

3. The jig of claim 1, wherein the base wall is positionable against a third surface of the first member that extends parallel to the second axis.

4. The jig of claim 2, wherein the first locator comprises a locating face of the locating wall that is positionable against the first surface of the first member.

5. The jig of claim 2, wherein the second locator includes a third edge of the locating wall that is positionable against the second surface of the second member.

6. The jig of claim 5, wherein the third edge is positionable against the second surface of the second member such that the third edge extends parallel to the third axis.

* * * * *